(12) United States Patent
Bachelor et al.

(10) Patent No.: US 8,964,507 B2
(45) Date of Patent: Feb. 24, 2015

(54) SYSTEMS AND METHODS IMPLEMENTING FREQUENCY-STEERED ACOUSTIC ARRAYS FOR 2D AND 3D IMAGING

(75) Inventors: Scott T. Bachelor, Poulsbo, WA (US); R. Lee Thompson, Kirkland, WA (US); Jason L. Seawall, Seattle, WA (US)

(73) Assignee: Teledyne Blueview, Inc., Bothell, WA (US)

( * ) Notice: Subject to any disclaimer, the term of this patent is extended or adjusted under 35 U.S.C. 154(b) by 0 days.

(21) Appl. No.: 12/551,974

(22) Filed: Sep. 1, 2009

(65) Prior Publication Data

US 2010/0074057 A1 Mar. 25, 2010

Related U.S. Application Data

(63) Continuation of application No. 12/030,043, filed on Feb. 12, 2008, now Pat. No. 7,606,114, which is a continuation of application No. 10/889,406, filed on Jul. 12, 2004, now Pat. No. 8,811,120.

(60) Provisional application No. 60/549,111, filed on Mar. 1, 2004, provisional application No. 60/485,981, filed on Jul. 11, 2003.

(51) Int. Cl.
*G01S 15/89* (2006.01)
*G01S 15/87* (2006.01)
*G10K 11/34* (2006.01)

(52) U.S. Cl.
CPC .............. *G10K 11/343* (2013.01); *G10K 11/34* (2013.01); *G01S 15/89* (2013.01); *G01S 15/8952* (2013.01); *G01S 15/8993* (2013.01)
USPC .............................. 367/104; 367/103; 367/88

(58) Field of Classification Search
CPC ... G10K 11/343; G01S 15/89; G01S 15/8952; G01S 15/8993

USPC ........................................... 367/103, 104, 88
See application file for complete search history.

(56) References Cited

U.S. PATENT DOCUMENTS

| | | | |
|---|---|---|---|
| 2,404,391 | A | 7/1946 | Mason |
| 3,419,845 | A | 12/1968 | Thiede et al. |

(Continued)

OTHER PUBLICATIONS

Thompson, R.L., et al. "Two Dimensional and Three Dimensional Imaging Results Using Blazed Arrays." Oceans 2001 MTS/IEEE Conference and Exhibition. Nov. 5-8, 2001. vol. 2, pp. 985-988. Washington, D.C.: Oceans 2001 MTS/IEEE Conference Committee.

(Continued)

*Primary Examiner* — Ian J Lobo
(74) *Attorney, Agent, or Firm* — Ann W. Speckman; Speckman Law Group PLLC

(57) ABSTRACT

Acoustic arrays transmitting and/or receiving multiple, angularly dispersed acoustic beams are used to generate 2D and 3D images. The acoustic arrays may comprise frequency-steered acoustic arrays provided in one-dimensional linear and two dimensional planar and curvilinear configurations, which may be operated as single order or multiple order arrays, may employ periodic or non-periodic transducer element spacing, and may be mechanically scanned to generate 2D and 3D volumetric data. Methods and systems for operating acoustic arrays in a frequency-steered mode in combination a mechanical beam steering mode, electronic time-delay and phase shift beam forming modes, and phase comparison angle estimation modes are also provided. Methods for generating two and three dimensional images of underwater target scenes using multi-beam acoustic imaging systems are disclosed.

8 Claims, 17 Drawing Sheets

(56) References Cited

U.S. PATENT DOCUMENTS

| | | | |
|---|---|---|---|
| 3,493,759 | A | 2/1970 | Adler |
| 3,784,805 | A * | 1/1974 | Rolle ............................ 367/11 |
| 3,794,964 | A | 2/1974 | Katakura |
| 3,905,009 | A | 9/1975 | Hughes et al. |
| 4,350,917 | A | 9/1982 | Lizzi et al. |
| 4,622,657 | A * | 11/1986 | Clare ............................ 367/129 |
| 4,692,722 | A | 9/1987 | Reichel et al. |
| 4,798,210 | A | 1/1989 | Ledley |
| 4,815,045 | A * | 3/1989 | Nakamura .................... 367/88 |
| 4,821,728 | A | 4/1989 | Ledley |
| 4,970,700 | A | 11/1990 | Gilmour et al. |
| 5,013,979 | A | 5/1991 | Birleson |
| 5,150,336 | A | 9/1992 | Sullivan et al. |
| RE34,566 | E | 3/1994 | Ledley |
| 5,511,043 | A | 4/1996 | Lindberg |
| 5,530,683 | A | 6/1996 | Lindberg |
| 5,549,111 | A * | 8/1996 | Wright et al. ................. 600/443 |
| 5,808,967 | A | 9/1998 | Yu et al. |
| 5,923,617 | A | 7/1999 | Thompson et al. |
| 6,084,827 | A | 7/2000 | Johnson et al. |
| 6,108,275 | A | 8/2000 | Hughes et al. |
| 6,176,829 | B1 | 1/2001 | Vilkomerson |
| 6,310,831 | B1 | 10/2001 | Dillman |
| 6,438,071 | B1 * | 8/2002 | Hansen et al. ................ 367/88 |
| 6,646,753 | B2 * | 11/2003 | Zhang et al. ................. 356/632 |
| 6,661,739 | B1 | 12/2003 | Benjamin et al. |
| 6,678,210 | B2 | 1/2004 | Rowe |
| 6,714,482 | B2 | 3/2004 | Rowe |
| 6,765,570 | B1 * | 7/2004 | Cheung et al. ................ 345/420 |
| 6,929,608 | B1 | 8/2005 | Hutchinson et al. |
| 7,035,166 | B2 | 4/2006 | Zimmerman et al. |
| 7,072,244 | B2 | 7/2006 | Rogers |
| 7,123,546 | B2 | 10/2006 | Zimmerman et al. |
| 7,173,879 | B2 | 2/2007 | Zimmerman et al. |
| 7,355,924 | B2 | 4/2008 | Zimmerman et al. |
| 7,450,470 | B2 | 11/2008 | Wilson |
| 2007/0025183 | A1 | 2/2007 | Zimmerman et al. |
| 2007/0159922 | A1 | 7/2007 | Zimmerman et al. |
| 2009/0027380 | A1 | 1/2009 | Rajan et al. |
| 2010/0020066 | A1 | 1/2010 | Dammann |

OTHER PUBLICATIONS

Hughes, W.J., et al. "Tilted directional response patterns formed by amplitude weighting and a single 90° phase shift." J. Acoust. Soc. Am., vol. 59, No. 5, pp. 1040-1045. (May 1976).

Frazier, C.H., et al. "Analysis of Resolution for an Amplitude Steered Array." Proceedings—IEEE Ultrasonics Symposium. Oct. 17-20, 1999. vol. 2, pp. 1231-1234. New York: IEEE.

Frazier, C.H., et al. "A high frequency amplitude-steered array for real-time volumetric imaging." J. Acoust. Soc. Am., vol. 112, No. 6, pp. 2742-2752. (Dec. 2002).

Frazier, C.H., et al. "Volumetric imaging with an amplitude-steered array." J. Acoust. Soc. Am., vol. 112, No. 6, pp. 2753-2762. (Dec. 2002).

Yuan, L., et al. "General Two-Dimensional Planar Transducers and Blazed Array-Like Interdigital Transducer." Proceedings—IEEE Ultrasonics Symposium. 1986. pp. 129-132. New York: IEEE.

Frazier, C.A.H. "A Two-Dimensional Amplitude-Steered Array for Real-Time Volumetric Acoustic Imaging." Doctoral thesis, 2000, University of Illinois at Urbana-Champaign, Department of Electrical Engineering.

Mechler, M.V. "A Line Hydrophone with Frequency Dependent Beam Steering." M.A. thesis. Aug. 1957. University of Texas at Austin, Department of Physics.

\* cited by examiner

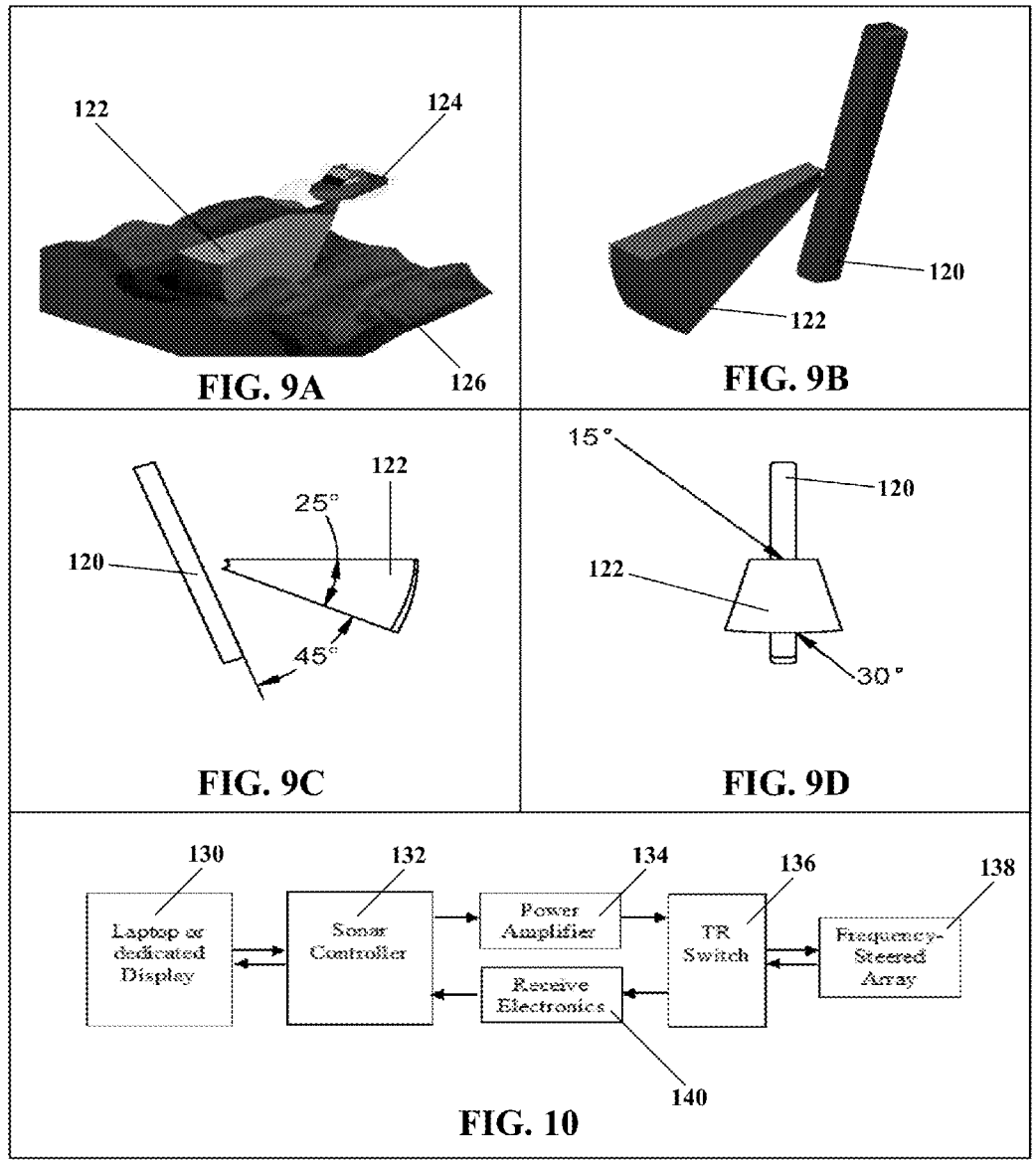

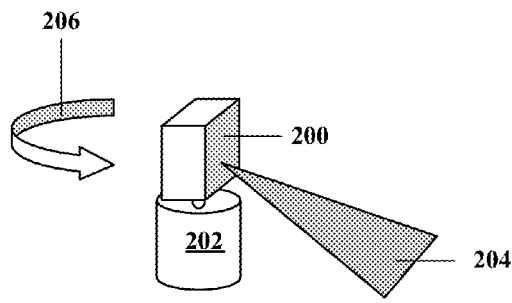
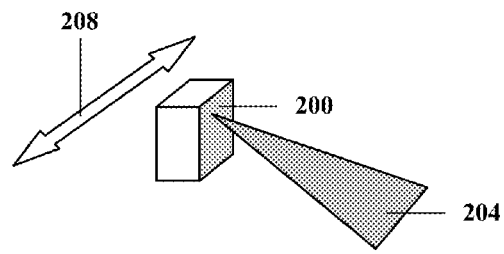
FIG. 16A  FIG. 16B
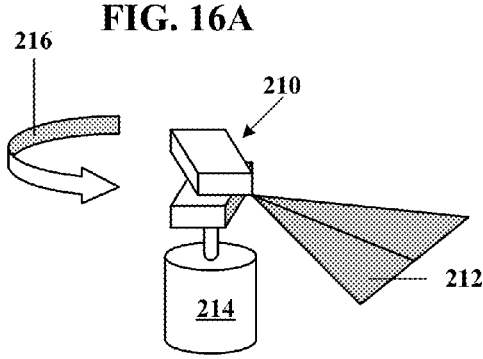
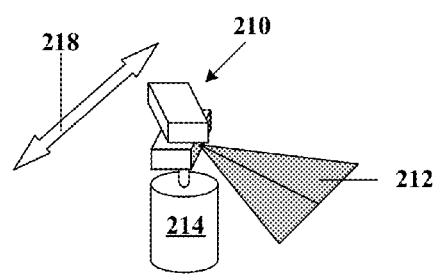
FIG. 16C  FIG. 16D
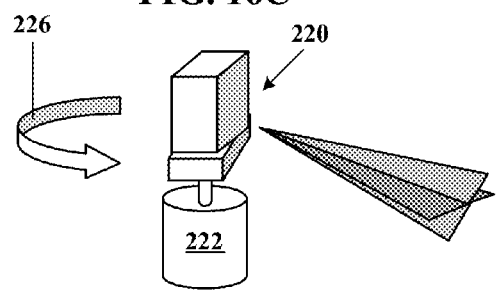
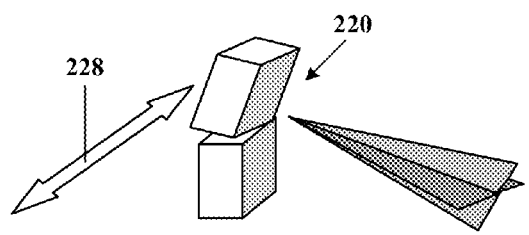
FIG. 16E  FIG. 16F

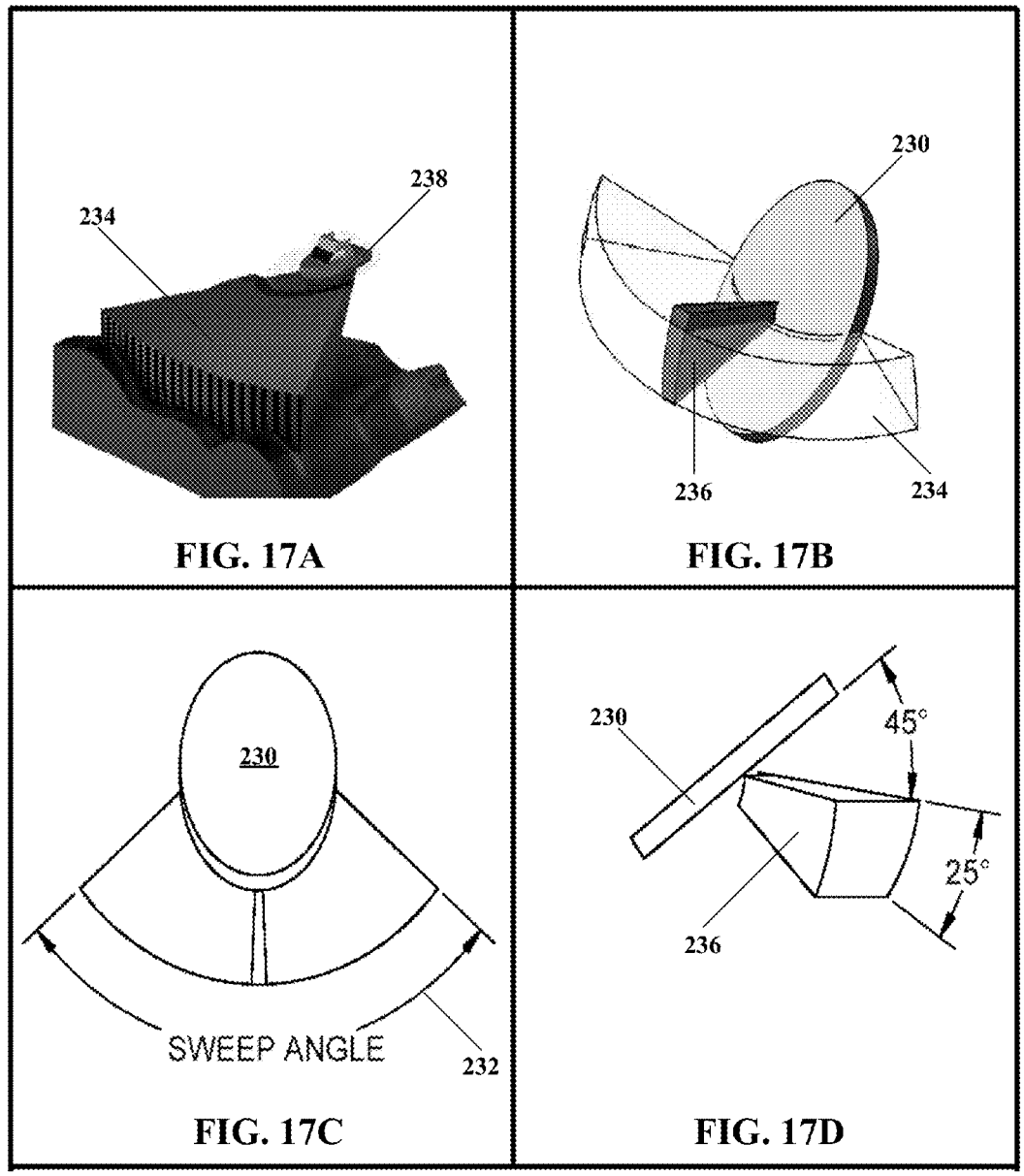

SYSTEMS AND METHODS IMPLEMENTING FREQUENCY-STEERED ACOUSTIC ARRAYS FOR 2D AND 3D IMAGING

REFERENCE TO PRIORITY APPLICATIONS

This application is a continuation of U.S. patent application Ser. No. 12/030,043, filed Feb. 12, 2008, which is a continuation of U.S. patent application Ser. No. 10/889,406, filed Jul. 12, 2004, which claims priority to U.S. Provisional Application No. 60/485,981 filed Jul. 11, 2003 and U.S. Provisional Application No. 60/549,111 filed Mar. 1, 2004. These patent applications are incorporated herein by reference in their entireties.

TECHNICAL FIELD OF THE INVENTION

The present invention relates to methods and systems implementing frequency-steered acoustic arrays that are particularly useful for 2D and 3D sonar and ultrasound device imaging systems.

BACKGROUND OF THE INVENTION

Traditional methods for forming and steering beams produced by an array of acoustic transducers involve phased or time-delayed acoustic pulses and require that each stave of the array be sampled as a separate hardware channel. Although this approach may produce effective, high-resolution imaging systems, it also requires substantial support electronics for each hardware channel, which increases the expense, size, weight, and power requirements of the system.

The radar community has used frequency to position beams using a frequency scanning radar technique. This technique employs delay lines in an antenna array that provide appropriate phase shifts so that the frequency determines the steering angle of the array's main beam. Frequency-steered beamforming systems have also be used in sonar systems with phase shifting electronics and multi-channel acoustic arrays. These systems use specific array designs and broadband pulses to map angular imaging information into the frequency domain. The beamformer for such a system may be designed around time-frequency (e.g. spectrogram, wigner) or time-scale (e.g. wavelets) decomposition data processing techniques. This approach allows multiple independent beams to be simultaneously formed using a single hardware channel.

Frequency-steered acoustic systems use angular spectral dispersion analogous to the dispersion of light incident on a prism or a diffraction grating to form spatially distinct beams. In the field of optics, diffraction gratings may be designed to take advantage of a unique set of discrete angles along which, for a given spacing d between facets, the waves diffracted from each facet are in phase with the waves diffracted from any other facet and the waves therefore combine coherently. The classical transmission grating equation is as follows:

$$\theta(\lambda) = \arcsin\left[\frac{m\lambda}{d}\right], \quad (1)$$

Where m is the "order" or number of wavelengths, $\lambda$, between the facets.

For a given grating design defined by the variables m and d, Equation (1) provide the mapping between angle and frequency. In a blazed diffraction grating, the individual facets are rotated away from the general plane of the array by some groove angle $\chi$. Several important aspects of a diffraction grating with respect to a frequency-steered system are noted when $\theta$, the angle between the beam and a plane normal to the plane of the grating is plotted versus wavelength for m=−2, −1, 0, 1, and 2. First, the zero order is frequency-independent and is real for all frequencies. Because the zero order beam is not steered as a function of frequency, this beam has been used in conventional systems, where the beams are steered with phase shifts or time-delays. However, this frequency-independent zero order beam is typically not useful in a frequency-steered system and therefore must be suppressed so that it will not produce ambiguous responses.

The first negative and first positive order beams enter the visible region (−90° to 90°) from what is commonly called the 'end-fire' orientation (perpendicular to the array normal) at $\lambda/d=1$. As frequency is increased, the first order beams are joined by the second order beams an octave higher in frequency, at $\lambda/d=0.5$. At all angles in between −90° and 90°, the first and second order beams are separated by one octave of spectral bandwidth. The second order beams may create ambiguities if more than one octave of spectral bandwidth is used.

The classical transmission grating equation is the fundamental frequency-steered acoustic beamforming equation. A simple frequency-steered beamforming and processing system is illustrated schematically in FIG. 1. From left to right, the diagram shows the flow of a broadband acoustic pulse 12 produced by a pulse generator and composed of acoustic beams having a range of frequencies $f_0 \ldots f_n$. The electrical signal output from broadband pulse 12 is input to an acoustic beamformer composed of projector electronics 14 and a frequency-steered array 16. The acoustic array is designed to produce a frequency-dispersed sound field 18 having a known, nonlinear relationship between angular space ($\theta$) and frequency f given by Eq. (1). In this way, a broadband signal containing many acoustic frequencies is sent into a frequency-steered array and emerges as a set of acoustic beams having different angular directions depending on frequency.

The frequency-dispersed sound field 18 from blazed array 16 interacts with the ambient environment and/or a target 20 and a backscattered, frequency dispersed sound field 22 is incident upon a receiver array 24, formed as a frequency-steered array, and receiver electronics 26 and is recombined into a broadband signal 28. Thus, reflected signals are received from the same angle they were transmitted and are recombined by the frequency-steered array to form a single broadband receive signal. Analog and digital processing techniques may then be applied to the broadband signal to separate out the frequencies and create and display an image similar to that of medical ultrasound systems.

One system for frequency-steering an acoustic sound field employs a "blazed array" having active faces of acoustic elements arranged at an angle from the general plane of the array. U.S. Pat. No. 5,923,617 describes a sonar system employing a blazed acoustic array including a plurality of stepped acoustic elements formed in an echelon array, with adjacent acoustic elements being displaced from one another. The blazed arrays described in the '617 patent are first order (m=1) arrays, having a single wavelength spacing between facets. The disclosure recognizes that higher-order and multi-order modes could be designed.

The simplest implementation of the blazed array and time-frequency beamforming is in a single channel 2D imaging sonar system. Data collected using a single channel blazed array and a spectrogram-based beamformer is presented in R. L. Thompson et al., "Two Dimensional and Three Dimensional Imaging Results Using Blazed Arrays," IEEE Oceans 2001 proceedings, pp. 985-988, vol. 2. This publication also describes a blazed array implementation in combination with conventional array design and beamforming techniques to produce 3D volumetric imaging. One 3D configuration employed a blazed array oriented vertically and flown horizontally to create a horizontal synthetic aperture. Several views rendered from 3D blazed synthetic aperture sonar data set are presented. Both the 2D and 3D systems were implemented with a single hardware channel.

SUMMARY OF THE INVENTION

Methods and systems of the present invention employ frequency-steered acoustic arrays and time-frequency signal analysis to provide acoustic imaging systems that produce multiple, angularly dispersed beams steered with frequency. These frequency-steered systems may be implemented with data processing techniques to generate a 2D image using a single hardware channel because the frequency-steered array effectively multiplexes the beam signals into separate frequency channels. If the frequency-steered array technique is used in conjunction with conventional array design and beamforming techniques, a 3D acoustic imaging system may be implemented using the same number of hardware channels that would be required for a conventional 2D system. These systems operate at the same data rate because the bandwidth of the reduced number of hardware channels increases to carry the extra spatial information. A frequency-steered array imaging system can thus collect an entire image with a single transmission, providing high resolution images at high frame rates and requiring low imaging scene stability.

Using frequency-steered arrays to produce 2D and/or 3D images in a sonar system implementation provides a number of advantages. First, because the frequency-steered array generates multiple beams using a single broadband signal, the amount of analog electronics required to produce an image is significantly reduced compared to that of traditional imaging sonar. By reducing the electronics required, the imaging sonar is significantly smaller, less expensive, and requires less power than traditional imaging sonar. Another advantage to using frequency-steered arrays in imaging sonar is that they are able to produce high quality images even in shallow waters. Traditional small sonar devices transmit and receive using a narrow frequency band, often with a relatively broad beam. In shallow water, these broad beam signals tend to be reflected from many surfaces and create what is commonly referred to as multi-path interference. These multi-path signals return from multiple directions (from the same target) and result in cluttered, confusing sonar images. Because a frequency-steered imaging system can generate many narrow beams in both transmit and receive modes, the system is less susceptible to multi-path signals and performs much better than conventional sonar devices in shallow water environments.

Imaging methods and systems of the present invention preferably utilize a broadband acoustic pulse as an input signal to a frequency-steered acoustic array having an order of $m=\frac{1}{2}$, $m=\frac{1}{4}$, $m=\frac{1}{8}$ or $m=1/n$ in a single order array, or a combination of one or more of these orders in a multiple order array. The broadband pulse may be an FM pulse, a scale-swept wavelet pulse train, a multi-wavelet, a multi-frequency pulse, pseudo-random, appended or overlapped series of sub-pulses matched to the array's scaled aperture function, or another type of broadband acoustic pulse. The broadband acoustic pulse preferably delivers generally equivalent energy to each of the frequency-steered beams generated.

Frequency-steered acoustic arrays may be constructed from various materials and provided in various configurations. Suitable acoustic transducers may be constructed from conventional piezoelectric materials such as lead zirconium titanate (PZT), polyvinylidene fluoride (PVDF) and other materials, and may be constructed using a variety of conventional technologies, including microelectromechanical systems (MEMS) technology and techniques. The acoustic transducer arrays may be provided in a single layer or multiple acoustic transducer layers may be stacked to form multiple layers. Because the frequency-steering technique uses a portion of the system's bandwidth to provide angular resolution, transducer technologies that provide broad bandwidth function will provide larger fields of view. Suitable acoustic transducer array materials and methods of construction are well known in the art.

The acoustic arrays may be provided as one dimensional "linear" arrays having essentially a single row or column of elements in a flat or curved configuration. Two dimensional "planar" arrays in which multiple rows and columns of elements are provided in a generally flat arrangement having a variety of configurations, such as circular, oval, square, rectangular and other polygonal configurations, may also be used. Two dimensional curvilinear arrays having multiple rows and/or columns of elements arranged in cylindrical, partially cylindrical, conical, partially conical and other curved configurations, are also employed in the methods and systems of the present invention.

The acoustic transducer arrays are electrically connected to an electronics structure that provides a common connection for multiple elements and communication with transmit and/or receiver control systems and electronics. The electronics structure may be provided integrally with the acoustic transducer elements or separately from but electrically connected to the array elements. This structure may be implemented in analog or digital form and in conjunction with analog or digital components to provide array shading, fixed or variable phase shifting or time delay, switching interconnections between electronics channels and element sets, signal amplification, or other functions. It is noted that when we refer to a "frequency-steered" or "frequency-steerable" array, we generally mean both the array of acoustic transducer elements and the associated electronics structure that, in combination, are capable of frequency-steering an input acoustic pulse.

Frequency-steered arrays may be implemented in transmit and/or receive modes and imaging systems of the present invention may utilize frequency-steered arrays exclusively. A "two-way beam pattern advantage" is realized when acoustic signals are transmitted and received on identical, collocated arrays. In this situation, the beam width is reduced to provide better resolution and the side lobes are reduced to provide reduced interference levels. Alternatively, imaging systems of the present invention may incorporate a frequency-steered array in combination with another non-frequency-steered acoustic array or transducer. In one embodiment, a frequency-steered array may be oriented in the same plane as a conventional array or, more preferably, a frequency-steered array may be oriented orthogonal to a conventional array. In one exemplary embodiment, a short-vertical frequency-steered array sweeps beams through the vertical dimension, and a long thin conventional acoustic array is used as a receiver. This system provides 3D imaging capability and is well-suited to side-scanning sonar applications.

Frequency-steered arrays of the present invention, including one dimensional linear arrays, two dimensional planar arrays, two dimensional cylindrical curvilinear arrays, two dimensional conical curvilinear arrays and two dimensional stacked conical curvilinear arrays may be operated as "shaded" or "unshaded" arrays. In a "shaded" array, a reduction in signal amplitude is applied moving from the center toward the outer elements of the array. Shading has the effect of reducing side lobe levels in the array's beam pattern. Alternatively, frequency-steered arrays of the present invention may be operated in an unshaded mode in which equivalent amplitude signals are applied to the array elements. Shading may be implemented through analog or digital components and by spatially varying the size of the individual elements.

As described above, the variable m of Equation (1) gives the 'order' of the array. This is the number or fraction of coherent wavelengths between two consecutive elements of the array at spacing d. FIGS. 2A-D illustrate the concept of the array order in periodic arrays and FIGS. 3A-D show the horizontal beam patterns produced using the different order "periodic" arrays having equivalent spacing or phasing between adjacent elements. FIG. 2A illustrates two elements of a "blazed" array having an m=1 design using element spacing d on the order of 1 wavelength, with each of the elements rotated away from the general plane of the array by a blaze angle. The individual beam patterns produced by each element of the array are narrow enough that the rotation of the element causes the mirror image lobe at −45° and the broadside lobe at 0° to be suppressed, as seen in FIG. 3A. FIG. 2B illustrates an m=½ blazed array design using element spacing d on the order of ½ wavelength and employing both alternating polarity phasing and element rotation. As shown in FIG. 3B, the alternating polarity phasing suppresses the broadside lobe at 0° and the element rotation suppresses the mirror image lobe at −45°. This m=½ array design may typically be implemented with electronics using a single hardware channel.

FIG. 2C illustrates an m=¼ array design using element spacing d on the order of ¼ wavelength, which employs element phasing and does not employ element rotation. The phasing alone suppresses the ambiguous mirror image and broadside lobes. The horizontal beam pattern produced by this array is shown in FIG. 3C. This design provides improved suppression, but at the expense of requiring electronics for at least two hardware channels. FIG. 2D shows an m=⅛ array design having element spacing d on the order of ⅛ wavelength. As shown in FIG. 3D, the m=⅛ design provides good ambiguous lobe suppression with no element rotation, but it also shifts the location of the main lobe to a position closer to 0°. This shift of the main lobe can be used to advantage by combining two orders to create a larger angular field of view using the same band of frequencies. The periodic frequency-steered arrays having orders m=¼, m=⅛, more generally m=1/n employed in the methods and systems of the present invention generally operate using fixed, though optionally selectable phase shifts between adjacent array elements.

Horizontal beam patterns for an unshaded order m=½ blazed frequency-steered array design having a blaze angle of 45° are shown in FIG. 4. The beam patterns for this frequency-steered array are shown for three frequencies: 300 kHz (solid line); 390 kHz (longer dashed line); and 480 kHz (shorter dashed line). The m=½ design is a particularly useful implementation because, as discussed above, in an even numbered array the balance of positive and negative phases across the array nullifies the zero-order beam. Also, when selecting the frequency band for a frequency-steered system, it is important to select a band of frequencies which do not excite more than one lobe in the array's beam pattern. This can generate multiple ambiguous returns from the multiple active lobes.

The principal peaks (beams) in an acoustic radiation pattern have a finite width determined by the resolving power of the grating or array. The angular width $\Delta\theta_0$ at the half-power levels (−3 dB from principal maximum) of the principal maximum for a linear, unshaded array of N elements steered about the array normal by an angle θ is given by the Equation:

$$\Delta\theta_0 = \frac{\lambda}{Nd\cos\theta}. \tag{2}$$

Eq. (2) demonstrates that the resolution of an array is independent of the order m and is based solely on the ratio of the wavelength λ to the aperture length Nd and the angle of the beam θ. The quantity Nd cos θ can be treated as the effective aperture encountered by the wave front arriving from angle θ. The resolution can therefore be expressed as the reciprocal of the number of wavelengths spanning the effective aperture. As the angle of incidence increases, the effective aperture decreases and the resolution declines. Changing the steering angle or the frequency in a frequency-steered array changes the beam width and hence changes the resolution. The horizontal beam patterns shown in FIG. 4 demonstrate that the beam widths decrease for the m=½ array as the main beam is frequency-steered from 45° to 27°. In fact, the beam width changes by a factor of almost two as the beam is swept over this range. This resolution change must be taken into account when implementing a frequency-steered system.

In one embodiment, frequency-steered arrays of the present invention produce two or more imaging fields of view in different directions. By selecting appropriate transmit signals, receive electronics and data processing routines, two or more imaging fields can either be activated simultaneously, or one at a time when only one field of view is required. In an m=¼ order array, for example, two fields of view may be simultaneously generated in a transmit mode in directions symmetric about the array normal by electrically connecting the 0° and 90° array elements together and the 180° and 270° array elements together and driving them with a 180° phase shift or with a +/− polarity. In this embodiment, the array has the same number of + and − phases, and the beam normal to the array is canceled. Alternatively, each of the four array elements (0°, 90°, 180°, 270°) may be wired together, with the ability to reverse the polarity of the 90° and 270° elements to −90° and −270° (i.e. interchange the 90° and 270° elements) to allow operation in a transmit mode on one of the fields of view at a time. The receive array may be similarly configured to select for received fields of view either alternately or simultaneously.

Single or multiple imaging fields of view generated using a frequency-steered array may be combined with the fields of view from one or more additional arrays to create larger continuous or non-continuous fields of view. Two frequency-steered arrays may be arranged in an 'X-configuration' in which the two arrays are arranged in the same plane at a fixed angle to one another to provide a continuous, larger field of view. Alternatively, two frequency-steered arrays may be arranged in a 'T-configuration' in which the two arrays are arranged in generally orthogonal planes, having the array faces aligned at a fixed angle to one another to provide combined vertical and horizontal imaging information.

Acoustic transducer element spacing is referred to as "periodic" when the distance and/or phase shift between neighboring array elements is substantially constant. Methods and systems of the present invention may also employ aperiodic acoustic arrays in which the distance and/or phase shift between neighboring array elements is not constant. Matched filter banks, for example, may be designed and used to provide appropriate spatial filtering for aperiodic frequency-steered arrays. Arrays may be aperiodically spaced in a spatially 'frequency-modulated' pattern (e.g. continuously differing spacing along the array), or in a spatially 'frequency hopped' pattern (e.g. different spacing along different sections of the array), or in an arbitrary or pseudo-random spacing configuration. Such arrays may advantageously resolve ambiguities between signals arriving from different angles symmetric about the broadside axis of the array and are described in greater detail below.

Time-frequency signal analysis is used to decompose a frequency-steered array signal to produce images. After a pulse has been transmitted, reflected from the target, and received, the beam signals are decomposed from the broadband signal. A frequency-steered imaging system is designed, ideally, to create an unambiguous mapping between the radiation or reception angle and the frequency domain of a signal, while the range information is mapped into the time domain. In the receiving mode, the goal is to process the signal so as to recover the maximum amount of angular and range imaging information from the received signal.

Frequency-steerable acoustic arrays may be operated in a frequency-steered mode in combination with another beam steering or beam forming mode, such as conventional mechanical beam steering modes, conventional electronic time-delay and phase shift beam forming modes, and phase comparison angle estimation modes. 2D and 3D acoustic imaging systems may be implemented using combined techniques to increase image quality and create 3D imaging systems.

BRIEF DESCRIPTION OF THE FIGURES

FIG. 2A illustrates an m=1 array design; FIG. 2B illustrates an m=½ array design; FIG. 2C illustrates an m=¼ array design; and FIG. 2D illustrates an m=⅛ array design.

FIGS. 9A-D illustrate an exemplary single field of view sonar implementation using a single, frequency-steered array of the present invention.

FIG. 10 shows a schematic block diagram for the sonar system of FIGS. 9A-9D.

FIGS. 16A-F schematically illustrate the combination of various frequency-steered arrays and frequency-steered array assemblies with mechanical steering mechanisms to produce various 2D and 3D imaging fields.

FIGS. 17A-D schematically illustrate an exemplary single field of view two-dimensional circular array aligned on a plane canted from the vertical axis and rotationally scanned to generate a 3D volumetric data set.

DETAILED DESCRIPTION OF THE INVENTION

Figure 1:
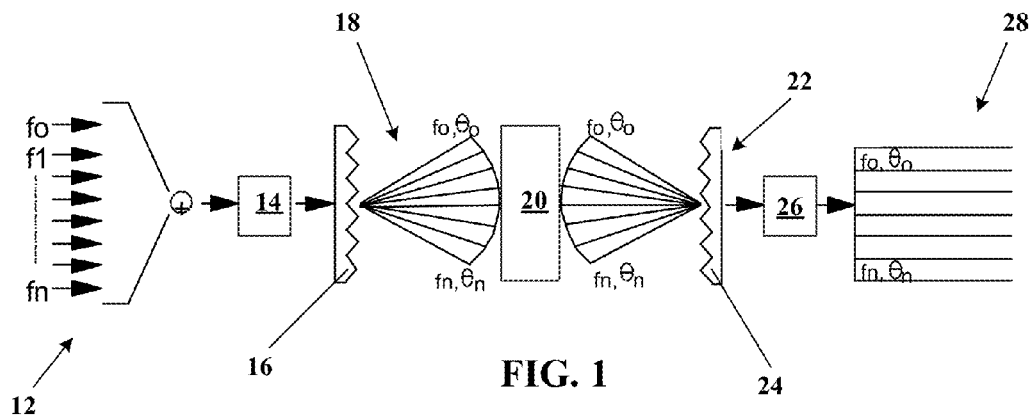
FIG. 1 shows a schematic illustration of frequency-steered acoustic array system and beamformer for generating an image.
Figure 2A:
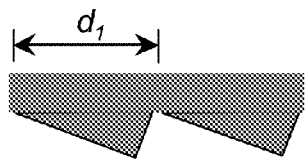
FIGS. 2A-2D illustrates four frequency-steered array designs with progressively decreasing orders.
Figure 2B:
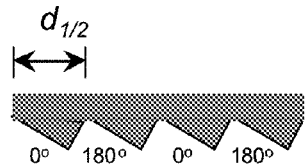
Figure 2C:
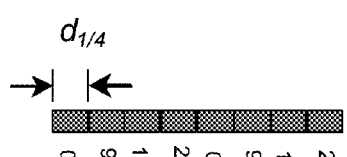
Figure 2D:
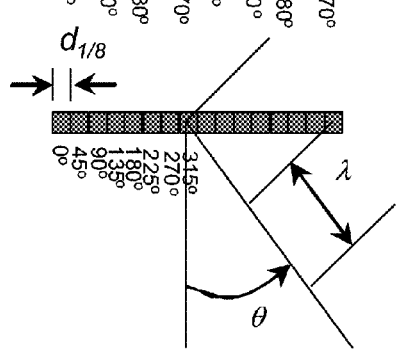
Figures 3A, 3B, 3C, 3D:
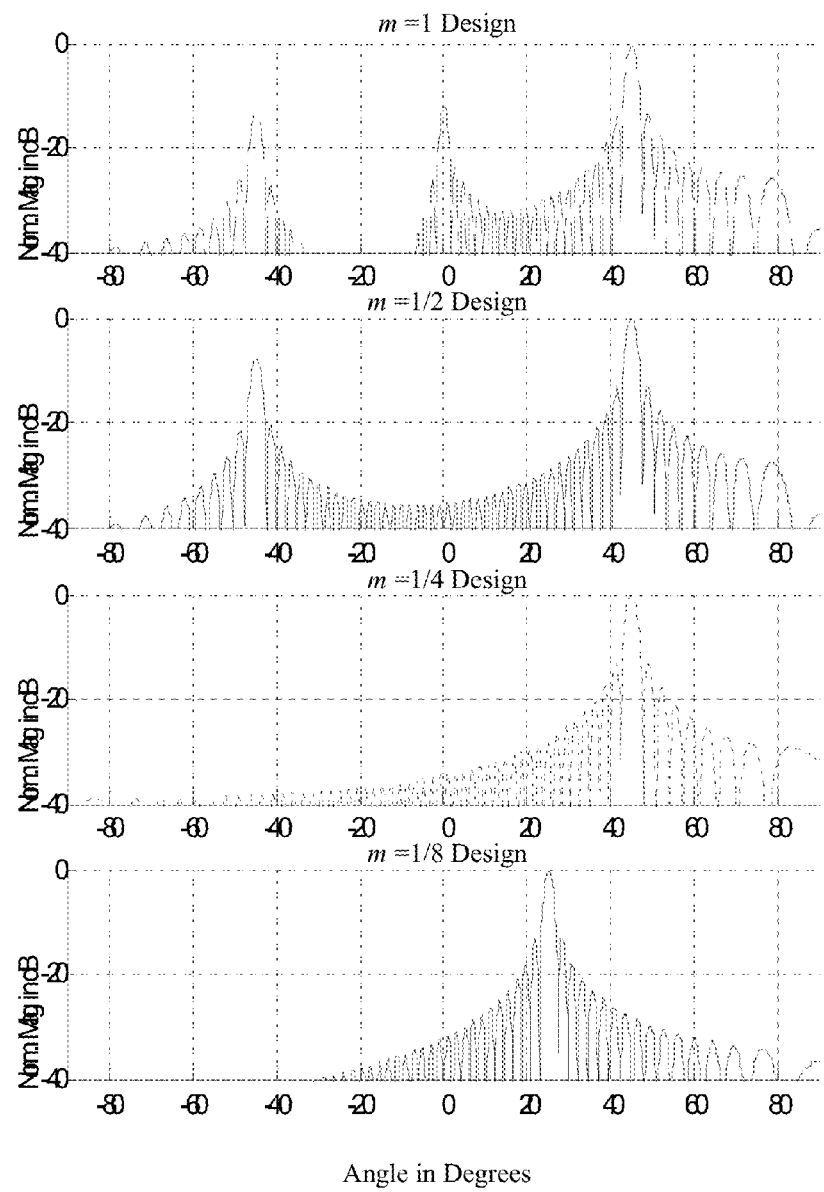
FIGS. 3A-3D show the horizontal beam patterns formed by the frequency-steered array designs illustrated in FIGS. 2A-2D, respectively.
Figure 4:
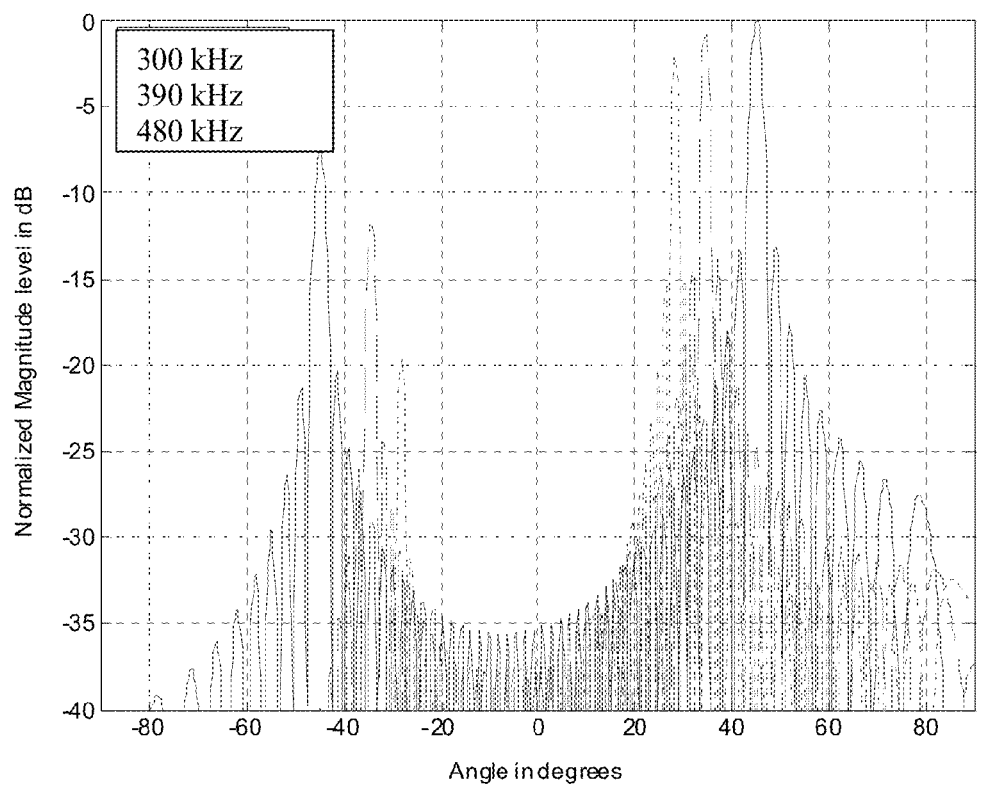
FIG. 4 illustrates exemplary horizontal beam patterns formed by an unshaded, order m=½ frequency-steered array having a blaze angle of 45°, plotted for frequencies of 300 kHz (solid line), 390 kHz (long dashed line) and 480 kHz (short dashed line).

Frequency-steered acoustic array systems and methods of the present invention utilize a broadband acoustic pulse as an input signal to one or more frequency-steered arrays that may have periodic or aperiodic spacing or phasing of transducer elements that may be blazed and/or phase shifted, that may be provided in a single order or a multiple order configuration, and that may be operated in a transmit and/or receive mode. Multiple frequency-steered acoustic array systems may be arranged in an X- or T-configuration to provide desired fields of view, and selected array configurations may be used in linear and/or rotational mechanical scanning modes to produce a variety of 2D and 3D data sets that may be processed to produce 2D and 3D images.

The input pulse to a frequency-steered acoustic array operated in a transmit mode is preferably a broadband pulse such as an FM pulse, a scale-swept wavelet pulse train, a multi-wavelet or multi-frequency pulse, or another broadband pulse. The input pulse preferably delivers equivalent energy to each frequency-steered beam. Appropriate sweeping of the pulse through frequency is important to utilize the array's full aperture, maintain the narrow band beam signal quality, and reduce interfering side lobes.

There are also resolution considerations for frequency-steered array output pulses. Using conventional (zero-order) beamforming techniques in a medium with phase velocity c, the minimum resolution in the propagation, or 'range,' direction is given by the Equation $$\Delta r = \frac{c\Delta\tau}{2} = \frac{c}{2B}. \tag{3}$$

Some modifications to the classical resolution and grating theory are necessary, however, for frequency-steered imaging.

There are different ways to calculate the effective parameters of pulse duration and bandwidth. Half-power measures over the entire pulse are generally used in conventional acoustic array system design. However, there is a fundamental issue with using this measure if one is using Eq. (3) to calculate range resolution in the case of a frequency-steered array system. The frequency-steered array may be viewed as an angle-dependent spectral filter. In other words, it acts as a narrow spectral filter whose properties depend on the angle of incidence. Therefore, for a beam pointed at a given angle of incidence, the array filters out a specific band or a 'sub-pulse' from any broadband transmitted or received pulse. Using a long frequency modulated (FM) input pulse, the sub-pulses generated by a frequency-steered array are radiated in or received from a different angular direction, and only the beam's specific band or sub-pulse contributes to range resolution for that beam. Hence, the half-power measure of the entire pulse incorrectly estimates a single beam's bandwidth and the resolution which can be achieved on that beam.

For a given angle of incidence, the frequency-steered array filters out a sub-pulse. Only that specific band of the sub-pulse can be used for range-resolution estimation. One can estimate this bandwidth for a frequency-steered array beam with a maximum at some angle θ by first assuming that the beam width is sufficiently small, such that the angle versus frequency relationship of Eq. (1) is effectively linear over the span of a beam. This assumption is an acceptable approximation for narrow beam (e.g., imaging) applications. The beam pointing angle θ is then positioned midway between the half-power points on the beam $\theta_-$ and $\theta_+$. When this midpoint assumption is combined with Eqs. (1) and (2), one finds the bandwidth $B_f$ spanned by the beam at any angle θ to be $$B_f(\theta) = \frac{2mc}{d} \frac{\sin(\theta) - \sin\left(\theta - \frac{\tan(\theta)}{2mN}\right)}{\sin(\theta)\sin\left(\theta - \frac{\tan(\theta)}{2mN}\right)}. \tag{4}$$

Eq. (4) can be substituted into Eq. (3) as the effective bandwidth to calculate the angle-dependent range resolution for the frequency-steered array as follows:

$$\Delta r_f(\theta) = \frac{c}{2B_f(\theta)}. \tag{5}$$

The effective pulse duration can also be determined using the effective bandwidth and the sweep rate α given in Hz/sec of the transmit pulse. If the pulse modulation is non-linear in time, then the sweep rate will be a function of angle, the effective pulse duration at each angle is:

$$T_f(\theta) = \frac{B_f(\theta)}{\alpha(\theta)} \tag{6}$$

and the effective spectral resolution at the angle θ is $$\Delta\omega_d(\theta) = \frac{2\pi}{T_f(\theta)} = \frac{2\pi\alpha(\theta)}{B_f(\theta)}. \tag{7}$$

Hence, the time-bandwidth product of a beam positioned at θ for a given frequency-steered array and transmit pulse combination is $$TB_f(\theta) = \frac{B_f^2(\theta)}{\alpha(\theta)}. \tag{8}$$

The time-bandwidth product, and hence the resolving power for a beam, is highly dependent on the sweep rate of the pulse.

One approach to 'normalizing' the beams of a frequency-steered array imaging system is to design the output pulse such that the 'sub-pulse' at each angle has a constant $TB_f$ product. Each sub-pulse will then have the same energy. A pulse with constant sub-pulse energy can be generated by solving for the sweep rate using Eq. (8) as the pulse is being generated to maintain a constant $TB_f$. As frequency increases, bandwidth increases, and pulse duration is commensurately decreased. Therefore, in preferred embodiments, the input signal sweep rate is not constant and the input pulse is a non-linear frequency-modulated pulse. Pulses maintaining a constant $TB_f=1$ can theoretically be processed to recover the full diffraction-limited azimuth resolution as determined by Eq. (2) and the full bandwidth-limited range resolution as determined by Eq. (5) using matched filters.

Figure 5A:
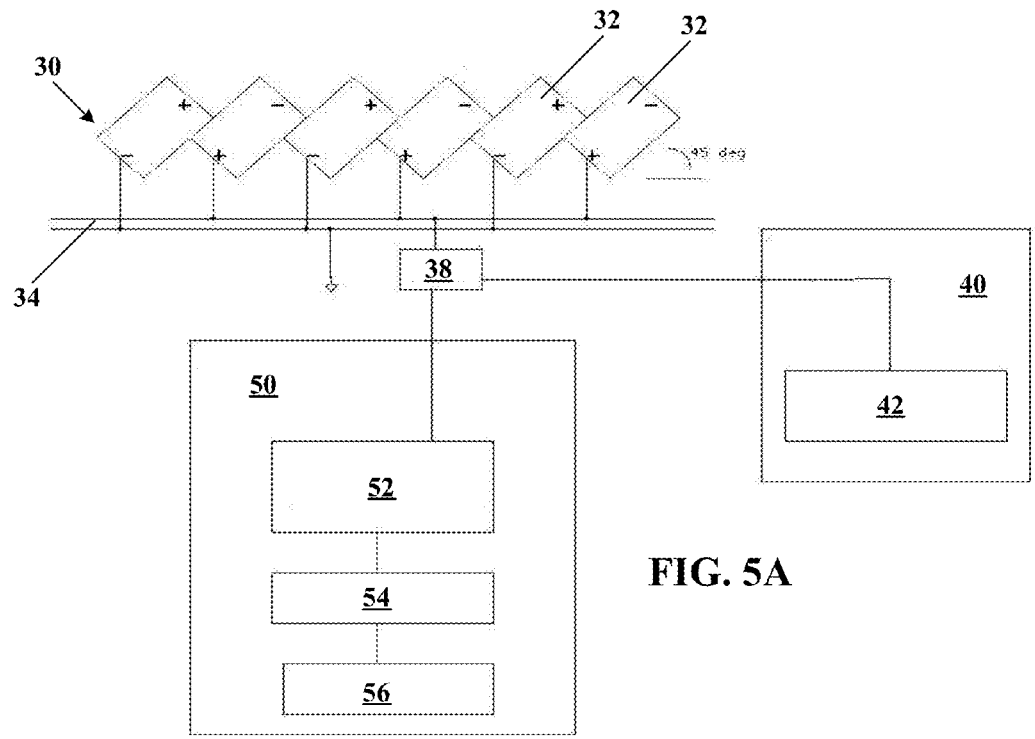
FIGS. 5A and 5B illustrate two exemplary electronics configurations for an m=½ frequency-steered array.
Figure 5B:
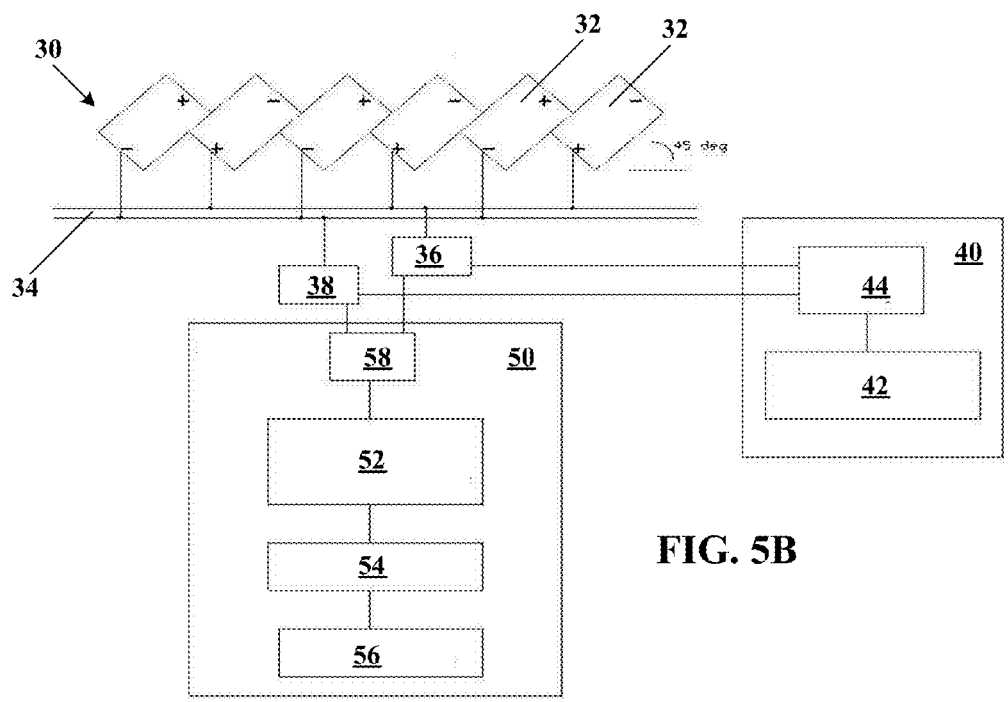

As described above, frequency-steered blazed arrays having an order m=½ that use both alternating polarity phasing and element rotation are useful for many 2D imaging applications. Two exemplary electronics configurations for m=½ frequency-steered acoustic arrays operated in both transmit and receive modes are illustrated in FIGS. 5A and 5B. In both configurations, array 30 is composed of multiple adjacent elements 32 spaced from one another by distance d on the order of ½ wavelength. The blaze angle, or the angle of the element face with respect to the planar orientation of the array, is 45° for both illustrated arrays. Elements 32 are in electrical connection with transmitter and/or receiver electronics 34, which may be formed integrally with the array elements, or may be provided separately from the physical array.

In the embodiment of FIG. 5A, transmitter and/or receiver electronics 34 are in electrical communication with transmitter/receiver (TR) switch 38, which is in electrical communication with transmitter system 40 and receiver system 50. Transmitter system 40 comprises a pulse generator and power amplifier 42 for generating a broadband acoustic pulse. Receiver system 50 comprises a receiver electronics component 52 which may incorporate a pre-amplifier, an analog filter and an A/D converter in operable communication with a digital signal processing system 54 and an image display system 56. This is a simplified system that does not provide phase shifting of the array elements but is capable of producing and/or receiving a frequency-steered beam in a single beam orientation.

In the embodiment of FIG. 5B, transmitter and/or receiver electronics 34 are in electrical communication with two TR switches 36 and 38, each of which is in electrical communication with transmitter system 40 and receiver system 50. Transmitter system 40 comprises a pulse generator and power amplifier 42 for generating a broadband acoustic pulse and a 180° phase shifter for phase shifting transmit signals. In addition to a receiver electronics component 52 comprising, for example, a pre-amplifier, an analog filter and an A/D converter in communication with a digital signal processing system 54 and an image display system 56, receive system 50 also comprises a 180° adder 58 which operates as a phase shifter and differential summer for received signals. This system provides phase shifting of the array elements in both transmit and receive modes and can be implemented to common mode interference signals.

Frequency-steered arrays may be extended to many orders m=1/n, where n is any positive or negative number. One particularly useful array design having an order m=¼, was described above. This design is attractive because it has polarity symmetry (i.e. as many positive as negative facets), which suppresses the zero order lobe. Element rotation in the m=¼ array is unnecessary because the 90° phase shifting suppresses the ambiguous symmetric lobe. In addition, because the 90° phase shifting controls the suppression of the ambiguous symmetric lobes, the polarity of the 90° phasing can be changed to switch between suppressing the symmetric lobes on the either side of the perpendicular. When the opposite symmetric lobe is suppressed, the other side becomes the main beam and the field of view is symmetrically switched from one side to the other. Therefore, the m=¼ array can produce two fields of view when the polarity of the 90° phase shifting is switched. The 180° phase can be created with the electronics using simple devices such as differential amplifiers and balanced transformers, or digitally with 4 independent drive and receive lines, or some combination of digital and analog phase shifting.

Figure 6A:
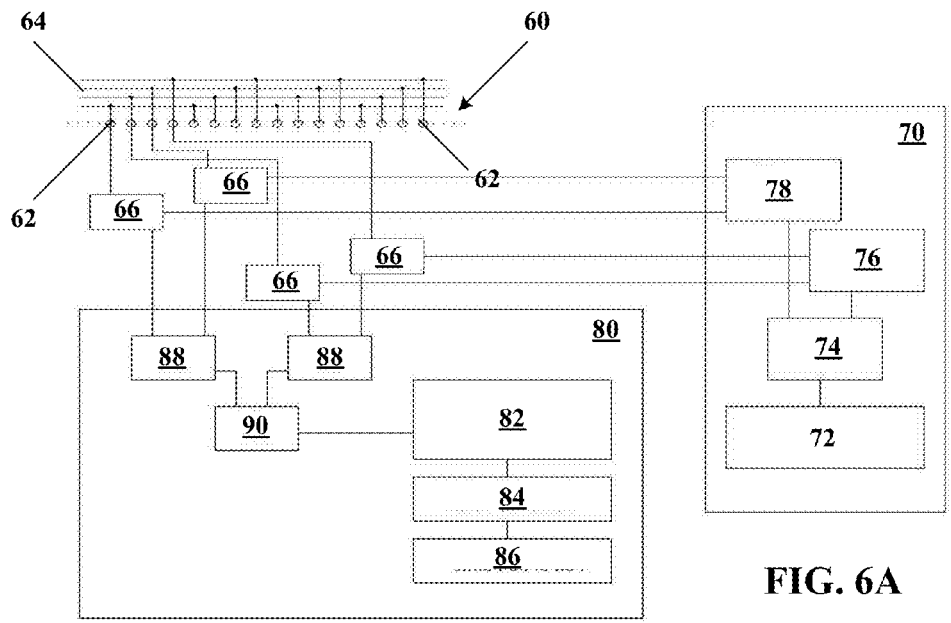
FIGS. 6A and 6B illustrate two exemplary electronics configurations for an m=¼ frequency-steered array.
Figure 6B:
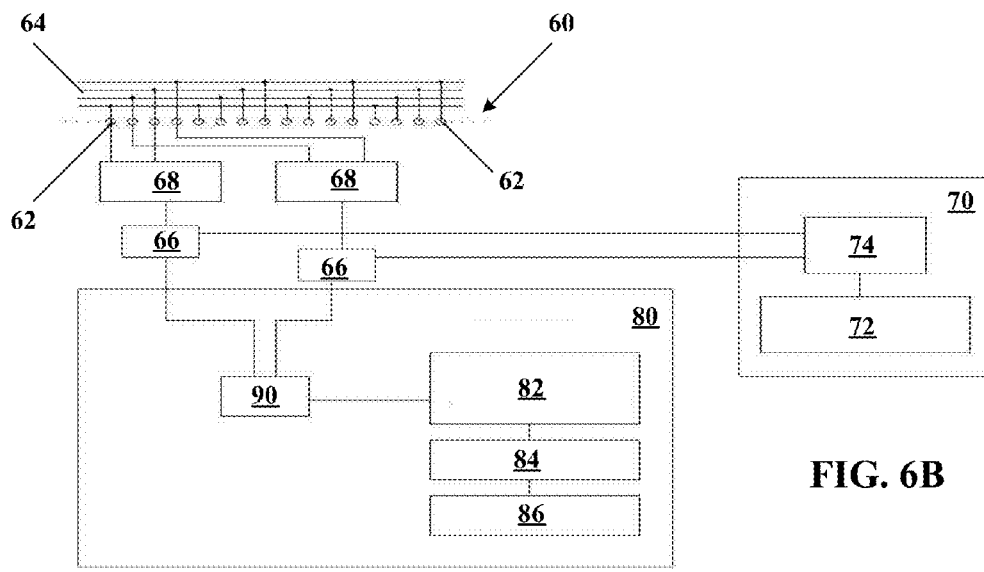

Two exemplary electronics configurations for m=¼ frequency-steered acoustic arrays are illustrated in FIGS. 6A and 6B. In both configurations, array 60 is composed of multiple adjacent elements 62 spaced from one another by distance d of ¼ wavelength. Array elements 62 are electrically connected to transmitter and/or receiver electronics structure 64, which communicates with transmitter and/or receiver control systems. The array is not blazed, but frequency-steering is achieved by applying phase differences of 90° to adjacent transducer elements. In both the electronic configurations illustrated in FIGS. 6A and 6B, the goal is to first create and transmit properly phase-shifted signals, and then receive and combine the out-of-phase return signals. In both cases, TR switches are used to isolate high-voltage transmit signals from the low-voltage receive electronics while transmitting and receiving using the same array.

In the acoustic array system of FIG. 6A, the transmit system 70 produces the 0°, 90°, 180°, and 270° phase-shifted signals. One way to generate these phased-signals is to employ a four channel arbitrary pulse generator/power amp subsystem. Another way to generate the required phased signals is to first use a two channel arbitrary pulse generator/power amp subsystem 72 to generate the 0° and 90° degree signals, and then use appropriate transformers to create the 180° and 270° phased signals from these original two signals. In the embodiment of FIG. 6A, for example, a 90° phase shifter 74 and two 180° phase shifters 76, 78 are used, in combination, to produce 0°, 90°, 180° and 270° phase-shifted signals that are controllably fed to neighboring transducer elements 62 through TR switches 66.

Receive system 80 accepts the 0°, 90°, 180°, and 270° phase-shifted return signals and combines them to form a single receive signal. One method of combining these signals through TR switches 66 is to amplify and digitize all four channels, and then combine them digitally. Another method of combining these signals is to use transformers to combine 180° phase-shifted signals, and then use an analog circuit to combine the resulting 90° phase-shifted signals. In the embodiment shown in FIG. 6A, received signals are processed through 180° adders 88 and 90° adder 90 before processing in receive electronics component 82 comprising, for example, a pre-amplifier, an analog filter and an A/D converter, digital signal processing system 84 and image display system 86.

In the acoustic array system of FIG. 6B, the 180° phase-shifting is taken out of the transmit and receive electronics subsystems and placed on the array side of the TR switches. In this system, each of the array elements 62 communicates with a TR switch 66 through a 180° adder 68. Transmit system 70 produces the 0°, 90°, 180° and 270° phase-shifted signals using pulse generator/power amplifier subsystem 72 and 90° phase shifter 74 in combination with TR switches 66 and 180° adders 68. Receive system 80 receives acoustic signals through 180° adders 68 and TR switches 66 and processes them in 90° adder 90 prior to processing in receive electronics component 82, digital signal processing system 84 and image display system 86.

The electronics configuration presented in FIG. 6B reduces the total electronics required in the system by combining transmit and receive 180° phase-shifting operations. This system may provide a reduction of signal-to-noise ratio compared to the system illustrated in FIG. 6A. One way to perform the 180° phasing at the array is by connecting the 180° and 0° elements and the 90° and 270° degree elements, but with the connections made to opposite polarity electrodes to reverse the polarity between those pairs of elements. Another way to achieve the 180° phasing is to use transformers.

Electronics configurations for different order acoustic array designs (e.g. m=⅛, m=1/16, m=1/n), though not specifically described, will be apparent to one of ordinary skill in the art based on the descriptions provided herein and on well-known electronics design principles.

The arrays described above are periodic that is, they have constant spacing and/or phase shifting between neighboring elements. Periodic element spacing (or a sampled spatial sinusoid) is not, however, essential to the function of a frequency-steered array. This is because aperiodic scaled aperture functions and matched filter banks can be employed during signal processing to provide appropriate spatial filtering. To understand the way in which an aperiodic frequency-steered array can be implemented, one must first look at the processing used to extract angle and range information. Received acoustic pulses are decomposed, in time and frequency domains, to extract information in angular and down-range directions and generate useful images. After a pulse has been transmitted, reflected from the target, and received, the beam signals are decomposed from the broadband signal. The process of decomposing the time and frequency domains of received signals is referred to herein as "time-frequency (TF) beamforming." One of the simplest methods of implementing a TF beamformer is to decompose narrow band digital time signals using STFT decomposition techniques, as described below.

In conventional Fourier analysis, signals are compared to complex, continuous sinusoidal basis functions. Because these continuous basis functions are not localized in time, the conventional Fourier transform of a signal can provide information only on the spectral content of the entire signal. For example, a Fourier transform of a signal having high-frequency energy at its beginning and low-frequency energy at its end shows only that the signal contains high and low frequencies. It does not show where in the signal these frequency components occur. However, sequential applications of Fourier transforms to short windowed portions of the signal may be employed to localize the signal's spectral content in time. This signal analysis technique is called a Short-Time Fourier Transform (STFT) and is described mathematically for a signal s(t) as $$STFT(t,\omega) = \int s(\tau)\gamma(\tau-t)e^{-j\omega t}d\tau, \tag{9}$$

where the function γ(t) is called the window function and is generally selected to have short time duration to provide good temporal resolution. The selection of the window function also has a significant impact on the spectral resolution of the STFT. In fact, resolution in both time and frequency are coupled and are governed by the time-frequency uncertainty principle. The time-frequency uncertainty principle states that there is a fundamental limit to the precision with which the signal energy can be resolved simultaneously in both the time and frequency domains.

The inherent limits to which the signal energy may be resolved in both time and frequency domains for a pulsed energy imaging system are expressed by the Equation:

$$\Delta\tau\Delta\omega_d = \frac{1}{TB} \tag{10}$$

where T and B are the pulse duration and bandwidth, respectively, of the transmitted pulse. Therefore, for a given duration-bandwidth product, the resolutions in time and frequency cannot both be made arbitrarily small. Generally, if the temporal resolution is improved, the spectral resolution declines, and vice versa. This is an important consideration when attempting to match time-frequency resolution to the physical diffraction and range resolution limitations of a frequency-steered array.

To process digitized receive signals, a discrete short-time fourier transform DSTFT having the following properties may be applied:

$$DSTFT(n, e^{j\omega}) = \sum_{m=\infty}^{\infty} s(m)\gamma(m-n)e^{-j(\omega)(m-n)}. \tag{11}$$

The discrete STFT may be applied using a bank of narrow band digital Finite Impulse Response (FIR) filters $h_f(n)$ with bandwidths determined by the window function γ(n) and center frequencies f such that where $$DSTFT(n, e^{j\omega}) = s(n)*h_f(n) \tag{12}$$

where $$h_f(n) = \gamma(-n)e^{j\omega n}. \tag{13}$$

Application of a bank of FIR filters to a frequency-steered array signal generates a set of time-domain 'beam' signals whose center frequencies can generally be correlated with steering directions given by Eq. (1) and diffraction-limited beam widths given by Eq. (2) (assuming TB≥1).

Although an FIR filter bank isolates the signal's energy into narrow bands, the DSTFT filters are not matched to the sub-pulses of the beams when a chirp transmit pulse is used. When a chirp transmit pulse is used, the frequency-steered array sub-pulses are narrow band portions of the chirp (or chirplets), while the 'filters' of an STFT are windowed sinusoids. The sub-pulses are the result of the frequency-steered array's spatial filtering characteristics on the transmitted pulse and/or the received pulse.

To illustrate this point, consider a planar wave front carrying a signal s(t) traveling at a phase velocity $c_0$, and arriving from incidence angle θ. This wave front creates a signal in space $s(r-tc_0)$ along the direction of travel. If this wave front impinges on a linear aperture a(x) aligned with the x-axis, the wave front's signal will be physically convolved with an effective aperture function scaled by sin(θ)

$$s_{blz}(t) = \int_{-\frac{L}{2}\sin\theta}^{\frac{L}{2}\sin\theta} a(r)s(r-tc_o)dr \tag{14}$$

where $$r = x\sin(\theta). \tag{15}$$

This convolution is analogous to the application of an FIR filter to the signal. However, each angle corresponds to a scaled version of the original aperture function observed at end-on incidence, θ=±π/2. The frequency-steered array acts as an angularly scaled, wavelets filter bank applied to signals arriving from different angles. Therefore, the optimal beamformer is a filter bank matched to the transmit pulse and the frequency-steered array aperture function. This optimal beamformer is generated by creating a wavelets filter bank based on the frequency-steered array's aperture function that is scaled by the trace velocity along the aperture $c_{tr}=c_0/\sin(\theta)$ so that $$h_a(\tau,\theta) = a(\tau c_{tr}(\theta))'. \tag{16}$$

This aperture filter bank is applied to the transmit pulse $s_{xmt}(t)$ of length T to generate a matched sub-pulse filter bank for each beam using the equation:

$$h_m(\tau, \theta) = \int_{-T/2}^{T/2} h_a(t, \theta) s_{xmt}(t-\tau) dt. \tag{17}$$

The aperture filter bank is applied to the transmit pulse only once if the frequency-steered array is used for only transmit or receive. It is applied twice if the frequency-steered array is used on both transmit and receive. The full inherent diffraction-limited and bandwidth-limited resolutions given by Eq. (2) and Eq. (3), respectively, can be achieved when using this type of beamformer.

This analysis leads to the important generalization that periodic spacing (or a sampled spatial sinusoid) is not critical to the function of a frequency-steered array. This is because aperiodic aperture and matched filter banks $h_m(\tau,\theta)$ can be designed to provide appropriate spatial filtering. Frequency-steered arrays of the present invention may therefore have aperiodic spacing between neighboring array elements, or between neighboring sets of array elements. Arrays may be aperiodically spaced, for example, in a spatially 'frequency modulated' pattern (e.g. continuously decreasing spacing along the array) or a spatially 'frequency hopped' pattern (e.g. different spacing along different sections of the array), or provided in arbitrary or pseudo-randomly spaced arrangements.

Figure 7:
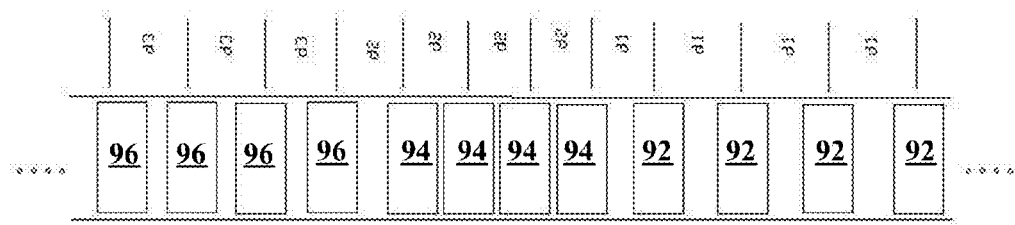
FIG. 7 illustrates an exemplary spatially 'frequency-hopped' aperiodic acoustic array configuration.

An exemplary frequency-hopped array design is shown schematically in FIG. 7. In this array configuration, a first set of n elements 92 is arranged with constant spacing $d_1$ between the elements; a second set of n elements 94 is arranged with a constant spacing $d_2$ between the elements; a third set of n elements 96 is arranged with a constant spacing $d_3$ between the elements, and so on. This frequency-hopped array configuration provides the advantage of resolving the ambiguities between signals arriving from different angles symmetric about the broadside axis of the array because a scaled version of the array's aperture function is effectively convolved with the transmitted or received signal. The asymmetric array's aperture function appears to an incident pulse to be time-reversed between the two angles symmetric about the broadside axis. To the extent that this scaled aperture function is uncorrelated with its equally-scaled and time-reversed aperture function, the symmetric, mirror image 'lobe' of the array can be suppressed. One embodiment that provides a reduction of spatial frequency side lobes is the spatially-frequency-hopped array design that is analogous to the well-known 'Barker coding' used in transmitted pulse design.

Another aperiodically spaced frequency-steered array design of the present invention uses an arbitrary phase shift theta between two sets of elements. In this configuration, array elements are interleaved such that the phasing of adjacent elements may be 0°, θ°, 180°, θ+180° and so on. This array design produces successful imaging results using either matched filter pulses or STFT signal processing if the appropriate phasing (0°, θ°, 180°, θ+180° is applied to add the signals coherently.

Multiple order frequency-steered arrays may also be used in systems and methods of the present invention and may be combined in the same frequency-steered array. One combination that improves resolution and increases the field of view for a single array is the combination of the m=¼ and m=⅛ order array designs. In one embodiment, the same array is used to produce both orders, with different wiring being provided for each order. This design provides an increased field of view using a single array and the same bandwidth input signal. The main beam of the m=⅛ mode complements the main beam of the m=¼ mode by sweeping over a different angular range for the same frequency band. The m=⅛ mode produces half the angular width field of view of the m=¼ mode, but it also has twice the resolving power of the m=¼ mode because the m=⅛ portion contains the same number of resolution cells spread over ½ the angular space. The m=¼ and m=⅛ modes generate two independent beams at each frequency, which can be combined over a one-octave band to produce a single, broader field of view. Additional array orders may be combined and, with appropriate wiring, a plurality of array orders may be embodied in a single frequency-steered array.

Figure 8A:
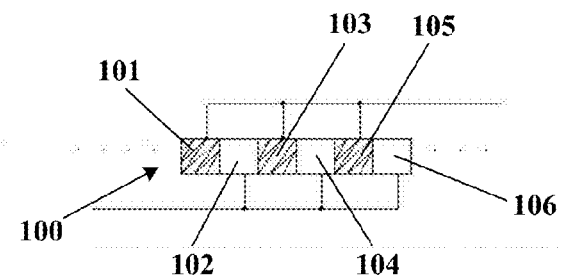
FIGS. 8A-8C schematically illustrate exemplary element arrangements for multi-order frequency-steered arrays.
Figure 8B:
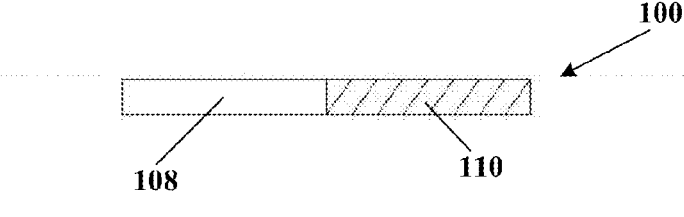
Figure 8C:
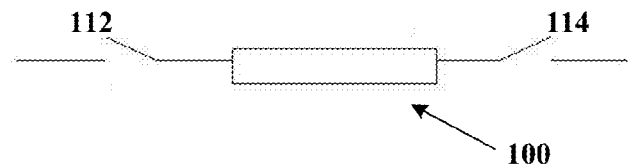

Such multiple order arrays may employ a single array of elements with different element wiring provided for operation in each order mode. FIGS. 8A-8C illustrate exemplary multiple order array element configurations. FIG. 8A illustrates the use of interleaved subelements within each individual array element. In this embodiment, an array element 100 is divided into a plurality of subelements 101-106 (six shown) that are wired alternately, with a first set of interleaved subelements 101, 103, 105 wired together and combined to provide the nth element of the order "B" array and a second set of interleaved elements 102, 104, 105 wired together and combined to provide an nth element of the order "A" array. FIG. 8B illustrates an embodiment in which each array element 100 is divided, with a first part 108 of the element feeding the order "A" array and a second part 110 of the element feeding the order "B" array. FIG. 8C illustrates yet anther embodiment in which each array element 100 is switchable between two different order arrays. In this embodiment, when switch 112 is actuated, element 100 is wired as an order "A" array; when switch 114 is actuated, element 100 is wired as an order "B" array. The array function and switching between array orders may be programmed or programmable, or may be selectable by the operator.

There are numerous ways frequency-steered array designs may be implemented in 2D and 3D imaging systems, such as sonar systems and methods utilizing a single or multiple arrays. The simplest design may use an m=½ or ¼ order array to generate a single field of view. This implementation may be used, for example, to look in front of a vessel and image the bottom and water column in front of the vessel to detect navigation hazards. Schematic diagrams illustrating various features of this implementation are shown in FIGS. 9A-9D, which show how a single frequency-steered array may be used in an underwater Obstacle Detection Sonar (ODS) system. By placing a frequency-steered array 120 in a vertical orientation, with one of the array's imaging fields of view 122 pointed forward, the system produces two-dimensional images of a vertical slice of the area directly in front of the imaging system and provides operators with information regarding potential obstacles in front of the system. The imaging field of view of this ODS system mounted on a vessel is shown schematically in FIG. 9A. FIG. 9A shows how the sonar's field of view 122 is oriented relative to a sensor platform mounted on a vessel 124 to provide images of the ocean floor and obstacles in front of the vessel 124. FIGS. 9C and 9D show a side view and frontal view of the array 120 and its field of view 122, respectively. This single order, frequency-steered array provides a 25° field of view and is suitable for use in shallow water environments.

FIG. 10 shows a simplified schematic diagram illustrating of one embodiment of a sonar imaging system using a frequency-steered array. The process flow for this system starts when either a processor or display system 130, such as a computer or a dedicated display device sends a request signal to sonar controller 132 via a digital communications line. After receiving the request, sonar controller 132 sends low voltage pulses to power amplifier 134, where they are converted to high voltage analog pulses. The high voltage pulses travel to frequency-steered acoustic array 138 through a TR switch 136 that isolates the low voltage receive electronics from the high voltage signals. Frequency-steered acoustic array 138 in turn transforms the high voltage electrical signals into acoustic signals that are sent out into the water. At this point, the receive side of the system is activated. Frequency-steered acoustic array 138 first transforms any returned acoustic signals into low voltage electrical signals. These low voltage electrical signals pass through TR switch 136 to the receive electronics 140, where the signals are amplified, filtered, and digitized. Once digitized, the return signals are read into sonar controller 132, where they are beam-formed into sonar images. The sonar controller then sends these images through the digital communications line to the processor or dedicated display 130, where they are either displayed or stored for later examination. Imaging systems of the present invention using various types of frequency-steered acoustic arrays and array combinations, may be implemented using similar systems configurations.

Figure 11A:
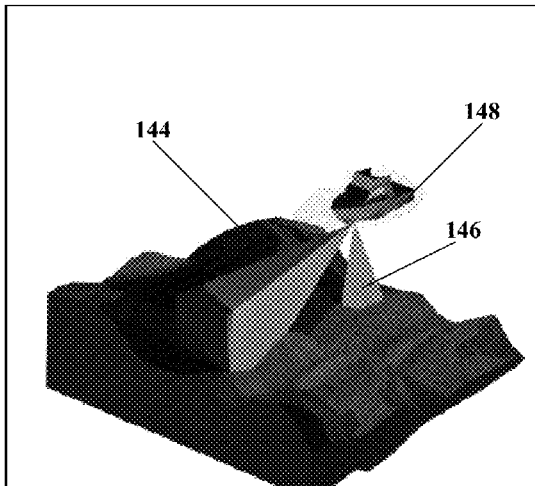
FIGS. 11A-D schematically illustrate an exemplary dual field of view sonar implementation providing both forward looking and downward looking capability using a single, frequency-steered array of the present invention.
Figure 11B:
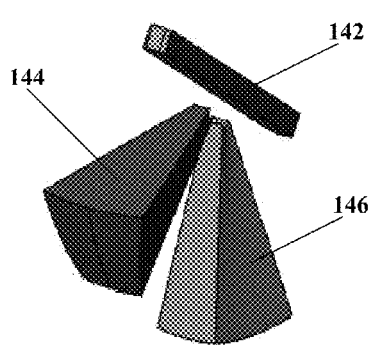
Figure 11C:
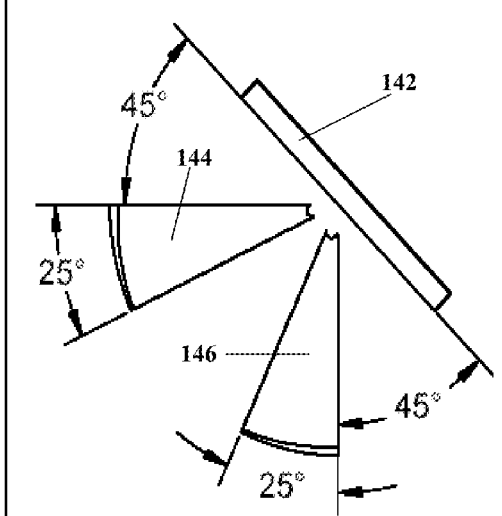
Figure 11D:
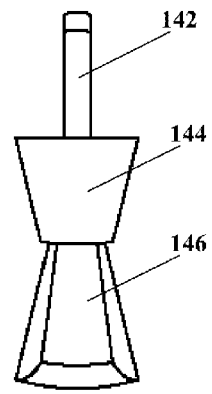

In another sonar system implementation illustrated in FIGS. 11A-D, a frequency-steered acoustic array 142 is configured to produce two or more axisymmetric fields of view. In the embodiment illustrated in FIGS. 11A-11D, the two fields of view 144, 146 provide images that are forward looking and down looking, respectively, which is advantageous for marine navigation and collision avoidance applications. This system provides both the ODS images of FIG. 9A, and Down Looking Sonar (DLS) images that show instantaneous images of the slice of bottom below the array. The 3D rendering in FIG. 11A shows how the sonar's fields of view 144, 146 are oriented relative to a sensor platform mounted on a vessel 148. FIGS. 11C and 11D show a side view and frontal view, respectively, of the array and its fields of view. In this embodiment, two 25° fields of view are provided in different orientations using a single frequency-steered acoustic array.

Multiple frequency-steered arrays may also be employed in methods and systems of the present invention. In one embodiment, two or more frequency-steered arrays are oriented in an 'X-configuration' to provide a wide field of view, with the output of each array contributing to a combined field of view. In an X-configuration, multiple arrays are oriented in the same steering plane with a fixed angular rotation of the constituent array faces in the frequency-steering plane. The fixed orientation rotation angle between the faces of the respective arrays is preferably between about 10° and 60° and, more preferably, between about 15° and 45° and depends on the array order or combination of orders and the bandwidth used. For example, when two, single order $m=\frac{1}{4}$ periodic arrays are used, a single wide continuous field of view can be generated by using a large bandwidth (greater than one octave) signal and by utilizing both fields of view on both arrays. Alternatively, three arrays could be used with smaller bandwidths to create wide, continuous fields of view.

Figure 12A:
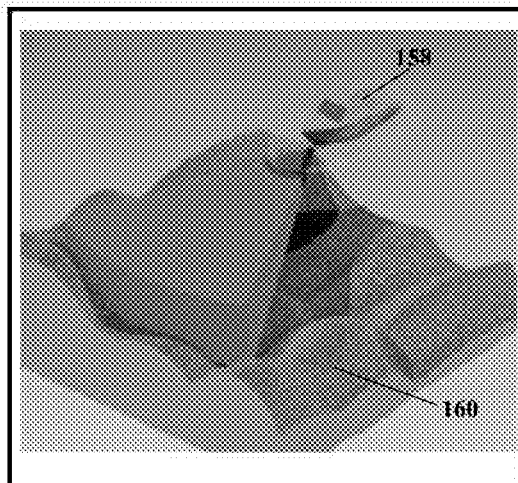
FIGS. 12A-D schematically illustrate an exemplary implementation incorporating two frequency-steered arrays arranged in an X-configuration to provide an overlapping, wide field of view.
Figure 12B:
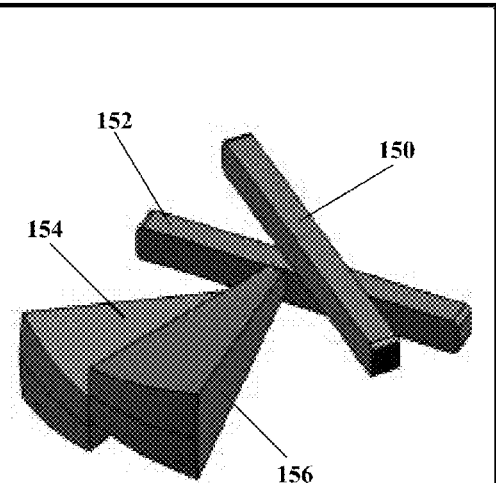
Figure 12C:
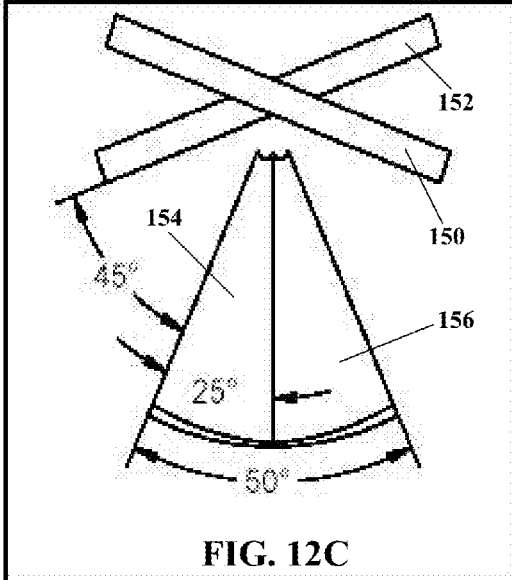
Figure 12D:
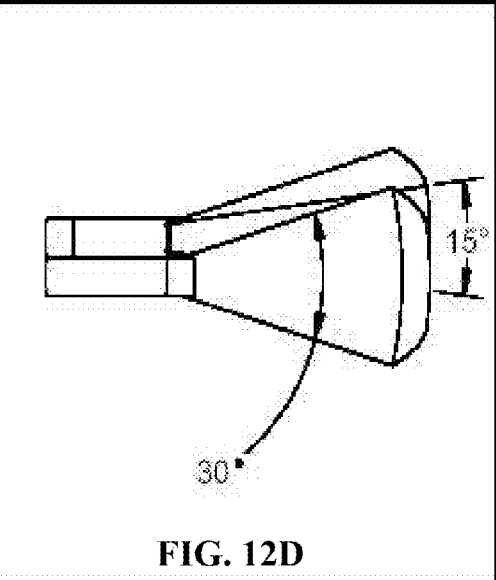

FIGS. 12A-12D illustrate, schematically, the capabilities and arrangement of multiple frequency-steered arrays provided in an X-configuration. The alignments, orientations, and fields of view are illustrated for two $m=\frac{1}{2}$ or $m=\frac{1}{4}$ arrays, but other array orders and combinations of array orders may be used in multiple acoustic array combinations implemented in an X-configuration. FIG. 12B shows how two frequency-steered acoustic arrays 150, 152 arranged in a horizontal X-configuration with the array faces at a 40° angle with respect to one another can be used in a Forward Looking Sonar (FLS) system to produce two contiguous fields of view 154, 156 providing high-definition images of objects and bottom features in front of the sensor platform. The 3D rendering in FIG. 12A shows how the sonar's combined fields of view are oriented relative to the vessel the arrays are placed on and the bottom surface 160. FIGS. 12C and 12D show a top view and side view of the arrays and their fields of view respectively. With proper angular arrangement of the arrays, the individual fields of view may be aligned, as shown, to provide a continuous, wide field of view. In this embodiment, two individual 25° fields of view are combined to produce a continuous, 50° field of view.

Although the X-configuration arrays are shown crossing near their midpoints, this is not necessary, and the arrays may cross one another at any point along their length. In other words, the crossing point of the arrays may be offset by some linear distance from the midpoint and still produce the same effect. The X-configuration is particularly effective in a two array system when high frequency beams are placed contiguously in the center of the overall field of view.

Figure 13A:
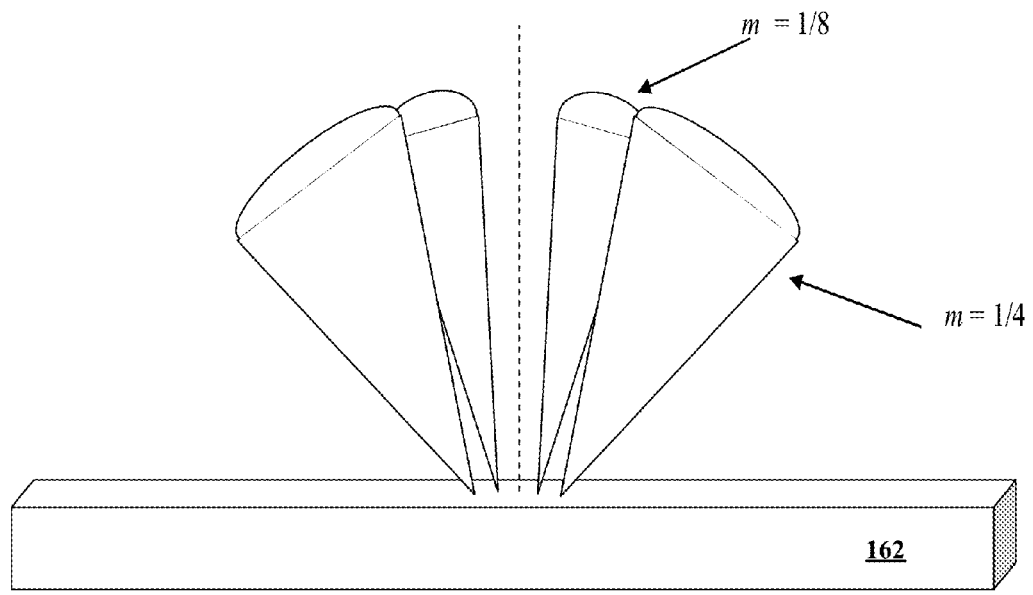
FIG. 13A schematically illustrates fields of view produced by a single, multi-order array (m=¼, m=⅛)
Figure 13B:
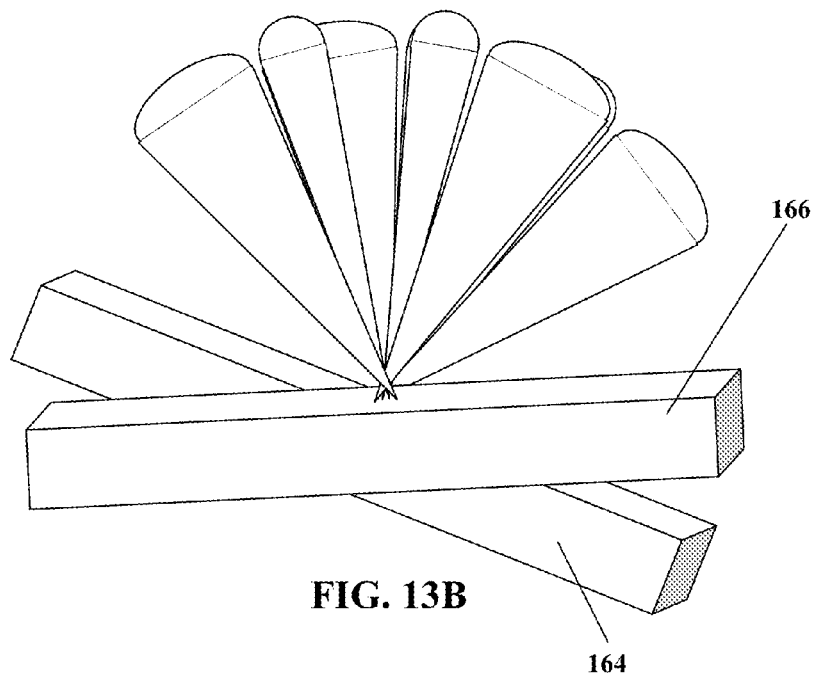
FIG. 13B illustrates the fields of view generated by the combination of two multi-order arrays in an X-configuration.

In addition to combining multiple, single order arrays in an X-configuration, two or more multiple-order arrays may also be implemented to create a larger field of view that, in an X-configuration dual array combination, may be adjusted to provide a contiguous or overlapping field of view with a single octave of bandwidth. FIG. 13A shows the fields of view generated using a single, multi-order array 162. It can be seen that the $m=\frac{1}{8}$ and $m=\frac{1}{4}$ fields of view on either side of a centerline are contiguous in this design. FIG. 13B illustrates how two of these multiple order arrays 164, 166 can be arranged in an X-configuration having a fixed angular rotation between the arrays, which provides a large, contiguous or slightly overlapping field of view.

Another useful multiple array configuration employs multiple frequency-steered arrays in a 'T-configuration' in which the individual arrays and fields of view are oriented orthogonal to each other and acquire imaging data in two dimensions. In this configuration, two or more fan-shaped fields of view may be oriented to intersect such that the axes of frequency-steering are oriented orthogonal to each other. The array faces of multiple frequency-steered arrays arranged in a T-configuration are arranged at an angle to one another that, in preferred embodiments, is less than 90°.

Figure 14A:
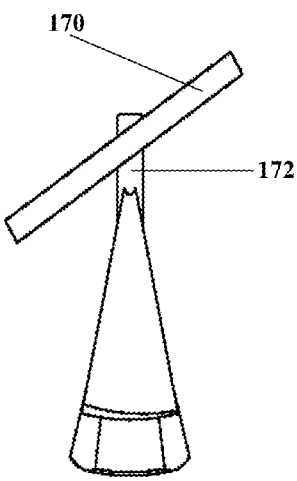
FIGS. 14A-D schematically illustrate exemplary implementations of multiple frequency-steered arrays arranged in a T-configuration, providing imaging information in two dimensions.
Figure 14B:
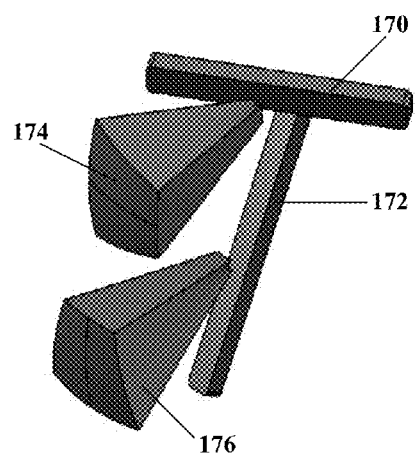
Figure 14C:
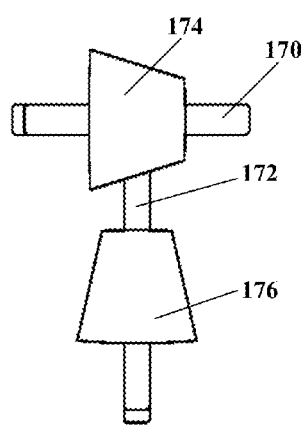
Figure 14D:
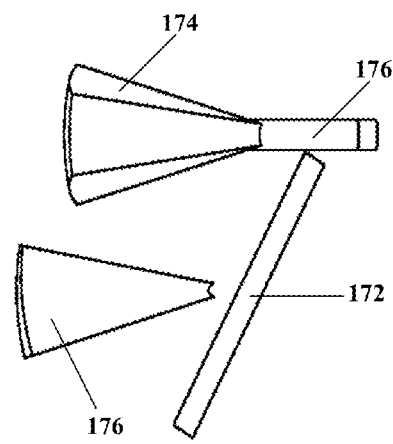

FIGS. 14A-D schematically illustrate several views of one arrangement in which two arrays are oriented in a T-configuration such that their fields of view 174, 176, respectively, are oriented orthogonal to one another. FIG. 14A shows a top view looking down on a two T-configured arrays. FIG. 14B shows a 3D rendering of the two frequency-steered arrays 170, 172 having faces arranged at an acute angle to one another, in T-configuration producing fields of view 174, 176. FIGS. 14C and 14D show two side views of the T-configuration combination.

Figure 15A:
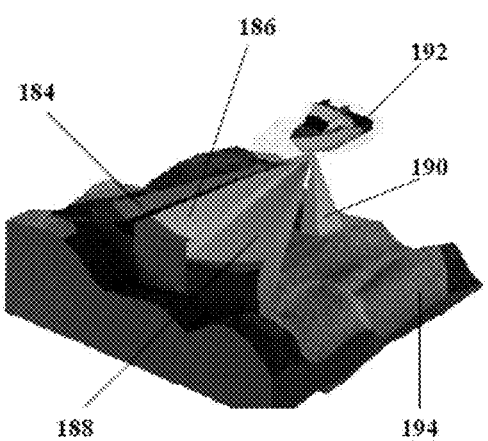
FIGS. 15A-D schematically illustrate an exemplary multi-array implementation incorporating two frequency-steered arrays arranged in an X-configuration and providing an overlapping, wide field of view in one orientation and two fields of view in an orthogonal orientation.
Figure 15B:
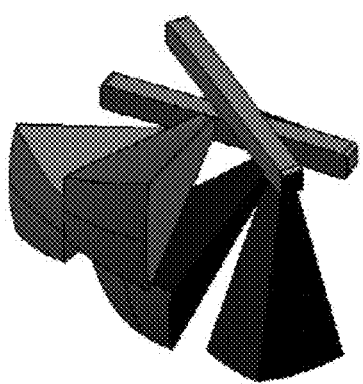
Figure 15C:
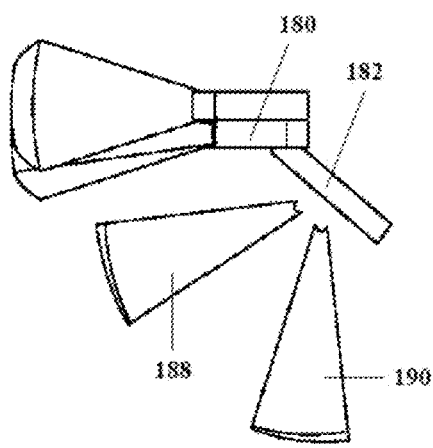
Figure 15D:
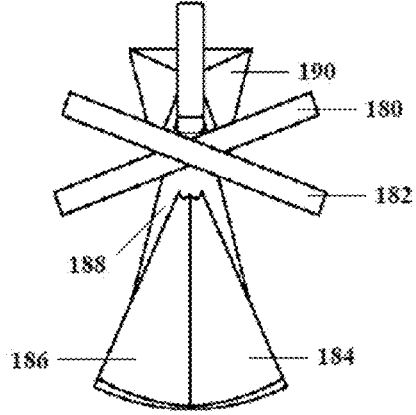

The multiple array T-configuration combination can be used in conjunction with the X-configuration by orienting the wider fields of view created by the X-configuration in orthogonal planes, as shown in FIGS. 15A-15D. These figures show how the configurations of FIGS. 11 and 12 may be combined to form a single imaging system that provides a user with all three of the types of sonar images described so far: obstacle detection, down looking, and forward looking. As shown in FIG. 15B, frequency-steered arrays 180 and 182 may be operated to produce fields of view 184, 186, 188 and 190. The 3D rendering in FIG. 15A shows how the multiple array configuration's fields of view are oriented relative to a vessel 192 the arrays are placed on. FIG. 15C and FIG. 15D show a side view and top view, respectively, of the arrays and their field of views respectively.

The frequency-steering techniques and frequency-steered arrays of the present invention may also be used in conjunction with other beam-steering and beam forming techniques, such as mechanical steering, conventional electronic time-delay and phase shift beam forming, and phase comparison angle estimation techniques. Table 1, below, summarizes illustrative 2D and 3D acoustic imaging system embodiments that may be implemented when combining frequency steering with other beam steering methodologies.

TABLE 1

| Non-Freq-steer beam steering technique | Freq-steer (single or multiple arrays) Orthogonal to Conventional Technology | Freq-steer (single or multiple arrays) In-plane with Conventional Technology |
|---|---|---|
| Conventional Mechanical Rotation | 3D Incoherent rotational stacking of image slices<br>3D Coherent - rotational synthetic aperture | 2D Incoherent overlay<br>2D overlay coherent in range direction<br>2D overlay coherent in range direction and rotational synthetic aperture providing coherent-level resolution in azimuth direction |
| Conventional Mechanical Linear (side look or forward look) | 3D Incoherent linear stacking of image slices<br>3D Coherent linear synthetic aperture sonar (3D SAS) | 2D Incoherent overlay<br>2D coherent overlay in range<br>2D coherent overlay in range and synthetic aperture |
| Conventional Electronic Rotational Beamforming | 3D Incoherent stacking of slices<br>3D Coherent - rotational synthetic aperture | 2D Incoherent overlay<br>2D coherent overlay in range<br>2D coherent overlay in range and synthetic aperture |
| Conventional Electronic Translational Beamforming | 3D Incoherent stacking of slices<br>3D Coherent linear synthetic aperture | 2D Incoherent overlay<br>2D coherent overlay in range<br>2D coherent overlay in range and synthetic aperture |
| Conventional Electronic Phase Comparison Angle Estimation | Stacked array processing: 3D image generation by estimating elevation angle in 2 or more beams | Split array processing: Target localization within a beam by choosing angle for given range bin from 2 or more arrays |

FIGS. 16A-F illustrate, schematically, frequency-steered acoustic arrays of the present invention used in exemplary combinations with mechanical steering techniques. The orientation of the mechanical scanning may be in a linear or rotational direction orthogonal to the frequency scanning plane or in the plane of the frequency-steered array. The frequency-steered arrays may be implemented with single-order arrays or multi-order arrays that have periodic or aperiodic element spacing and/or phasing.

FIGS. 16A and 16B illustrate frequency-steered array embodiments in which mechanical scanning is implemented in a direction orthogonal to the direction of the frequency-steered beams. FIG. 16A illustrates a single frequency-steered planar array 200 combined with a rotational mechanical beam steering mechanism 202 that can be used to collect 3D data sets by mechanically scanning vertical frequency-steered beams 204 around an axis of rotation in a scanning motion 206. FIG. 16B illustrates a single frequency-steered planar array 200 combined with a translational mechanical beam steering mechanism providing a scanning motion 208 to produce a 3D data set using vertical frequency-steered beams 204. When mechanical scanning is implemented orthogonal to the direction of frequency-steered beams, as is the case in the embodiments exemplified in FIGS. 16A and 16B, multiple images from separate transmissions can be combined incoherently by stacking in a rotational or side-by-side manner (if linearly translated) to create a 3D volumetric data set. This data set can be processed to render 3D images of the target scene.

If the re-registration of a frequency-steered array scanned orthogonal to the frequency-steered plane is achieved at accuracies of less than approximately 20% of a wavelength, and if the array is offset from the center of rotation by some distance $D_{rot}/2$, the array sweeps a circular synthetic aperture with a diameter $D_{rot}$. If an adequate number of pings are collected to provide sufficiently small spacing (e.g. $<\lambda/2$ of highest frequency) of the 'synthetic elements' of the synthetic aperture and the re-registration is sufficiently accurate, the data may be coherently processed to recover the full azimuth resolution provided by the circular synthetic aperture swept out by the array. Adequate re-registration for this coherent processing is relatively simple to achieve on a platform that is stationary relative to the imaging scene (such as a bottom-mounted sonar). It is noted here that a similar situation can be achieved with a straight line (or a known or measured arbitrary path).

FIGS. 16C and 16D illustrate frequency-steered array embodiments in which mechanical scanning is implemented in the frequency steering plane of the arrays. FIG. 15C illustrates two frequency-steered acoustic arrays oriented in an X-configuration, providing a dual array combination 210 that produces a wide field of view horizontal beam 212. Dual array combination 210 may be combined with a rotational mechanical beam steering mechanism 214 that rotates the dual array combination in a rotational scanning path 216 to produce a 2D data set. FIG. 16D illustrates two frequency-steered acoustic arrays oriented in an X-configuration providing a dual array combination 210 that produces a wide field of view horizontal beam 212 that may be combined with a translational mechanical beam steering mechanism moving the dual array combination along a linear scanning path 218 to produce a 2D data set.

When implemented in this manner, the images may be combined incoherently by processing multiple overlain pixels (e.g. using the mean level) that are re-registered to the accuracies better than one resolution cell. This improves the resolution and reduces speckle by effectively increasing the bandwidth of the pixels (incoherently) as they are a combination of pixels generated by the bandwidths of multiple frequency dispersed beams when the overlay processing is completed. This technique produces a 2D mosaic image having superior resolution and quality compared to an image produced by a single transmission imaging system.

If the re-registration can be achieved to accuracies of less than approximately 20% of a wavelength, then the pixels can be combined coherently and the full bandwidth of the system distributed over multiple frequency-steered beams (and hence the full range resolution) can be recovered. Therefore, an $m=\frac{1}{4}$ frequency-steered imaging system using one octave of bandwidth spread across approximately 20 beams recovers the full octave of bandwidth on each pixel with 20 independent rotated pings, where all twenty independent frequency beams have been rotated onto the pixel in question. In addition, if the array is offset from the center of rotation by some distance $D_{rot}$, the array will sweep out a circular synthetic aperture with a radius $D_{rot}$. If an adequate number of pings are collected to provide sufficiently small spacing (e.g. <λ/2 of highest frequency) of the 'synthetic elements' of the synthetic aperture and the re-registration is sufficiently accurate, the data may be coherently processed to recover the full system bandwidth, and hence full range resolution, and the full azimuth resolution provided by the circular synthetic aperture swept out by the array. Adequate re-registration for this coherent processing is relatively simple to achieve on a platform that is stationary relative to the imaging scene (such as a bottom-mounted sonar). This processing will produce a 2D mosaic image with further enhanced resolution and quality compared to that of the incoherently processed and single transmission images.

Mechanical steering techniques may also be used with T-configuration frequency-steered arrays. This can be accomplished by combining multiple frequency-steered arrays (either single order or multi-order) arrays in a T-configuration to provide a 3D scanning configuration and a 2D overlay scanning configuration. This allows any combination of the 2D and 3D multi-ping processing schemes described above to be implemented at the same time. FIG. 16E illustrates two frequency-steered arrays in T-configuration combination 220 mounted on a rotational mechanical beam steering system 222 to produce intersecting fields of view 224. This system may be used to generate 2D data sets and, when scanned in a rotational scanning path 226, this system provides 3D data sets. FIG. 16F illustrates two frequency-steered arrays arranged in T-configuration combination 220 combined with a linear mechanical beam steering mechanism capable of scanning the combination array 220 along a linear scanning path 228 to create 3D and 2D data sets.

Frequency-steered arrays may also be implemented in combination with conventional electronic beamforming techniques. This approach may incorporate two-dimensional planar or curvilinear array designs wherein the array elements in the dimension orthogonal to frequency-steering are used with conventional time and phase shifting or acoustic lens beamforming techniques to create a 3D volumetric imaging system. The single-order and multi-order frequency-steered arrays discussed above may also be implemented with phase comparison techniques that allow measurement of the angle of arrival between two overlapping beams when the phase shifts of the two narrow band returns are measured. This combination of frequency-steering and phase comparison (i.e. phase monopulse) may be implemented orthogonal to the frequency-steering plane or in the same plane as frequency-steering.

FIGS. 17A-D illustrates, schematically, a single field of view design employing a two dimensional circular frequency-steered array 230 aligned on a plane canted from the vertical producing a field of view 236 and mechanically rotated through a sweep angle 232 along a sweep path 234 to generate a 3D volumetric data set. The sweep angle may be programmed into a device implementation, or it may be programmable or selectable by the user. In this particular system, a frequency-steered array is mounted vertically with one of its fields of view pointed forward. A rotating motor is then used to scan the array's vertical 2D field of view over a given rotation angle. At multiple angles within the rotation, 2D images are collected. Finally, the separate 2D images are combined to form a single 3D image of an area scanned. The 3D rendering in FIG. 16A shows how the scanned fields of view through sweep path 234 are oriented relative to a vehicle 238 the array is placed on. FIGS. 16C and 16D show a top view and side view of the array and its scanned field of view respectively.

Figure 18:
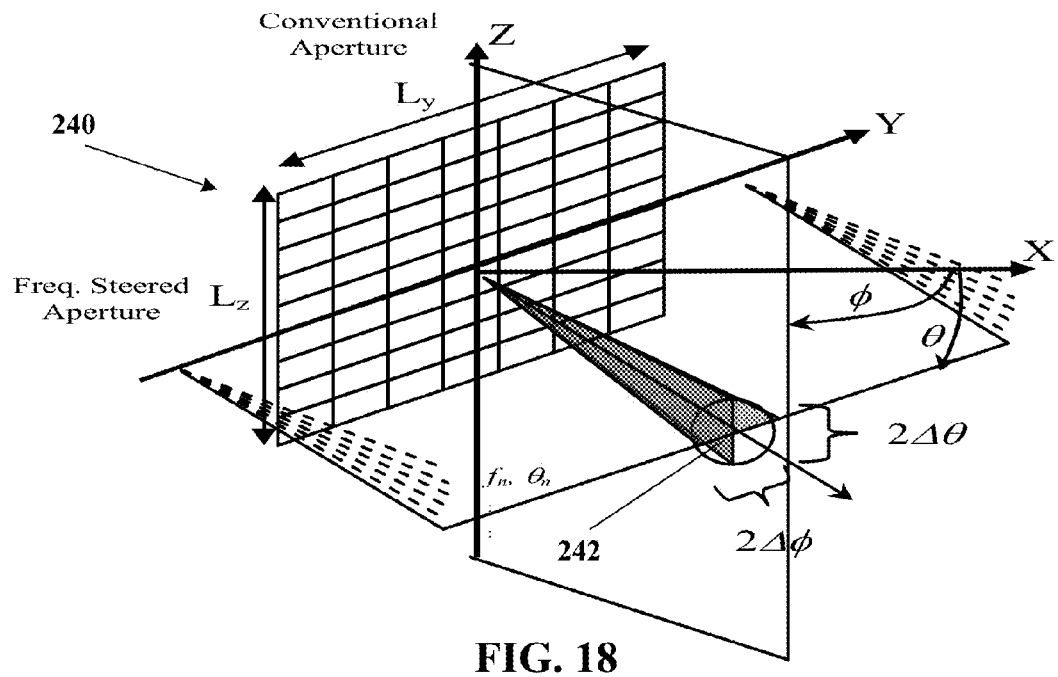
FIG. 18 illustrates an exemplary combination of frequency-steered and conventional time-delay beamformed 3D imaging implementation using a two-dimensional planar rectangular array.

Perhaps one of the most versatile combinations of conventional and frequency-steering techniques is the combination frequency-steering and phase shifting or time shifting (sometimes called true time delay beamforming) techniques. FIG. 18 shows a schematic diagram illustrating the operation of a combined frequency-steered and time-delay beamformed planar array 240 of the present invention. The illustrated array 240 is a two dimensional array and may be provided in a square, rectangular, circular, oval, or any number of other candidate configurations. A circular configuration is advantageous for many applications because the produced beam pattern has low side lobe levels. The two dimensional array may be implemented to provide frequency steering in the vertical direction and time-delay beamforming in the horizontal direction and, in this embodiment, creates a 3D volumetric field of view composed of a 3D set of conical beams 242.

In this embodiment, conventional beamforming techniques are used to focus and steer beams horizontally to create images on each of a set of frequency-steered imaging planes. Multiple arrays arranged in X- and/or T-configurations may also be implemented with two planar arrays operated to provide both frequency steering and time-delay beamforming in different directions to produce 3D volumetric data sets that can be processed to generate 3D images. The combination of frequency-steering and phase shifting or time shifting (sometimes called true time delay beamforming) techniques may be implemented with both single-order and multi-order arrays.

Figure 19:
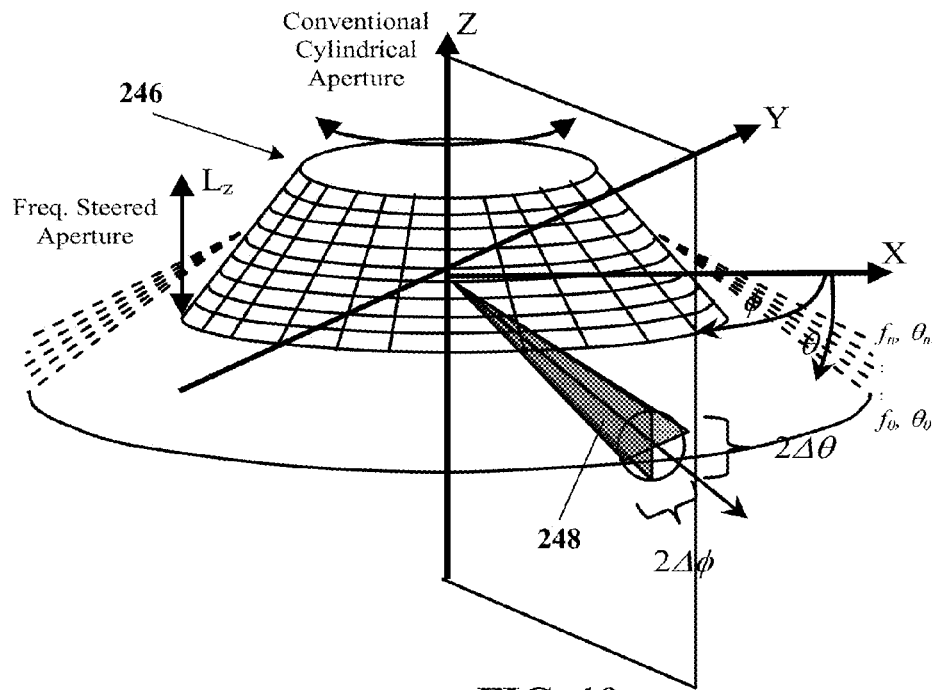
FIG. 19 illustrates an exemplary combination of frequency-steered and conventionally beamformed (phase shift or time delay) 3D imaging implementation using a conical curvilinear array.

FIG. 19 illustrates a partially conical curvilinear array 246 implemented using a combination of frequency steering in the vertical dimension and conventional beamforming (phase shift or time delay) techniques in the orthogonal (cylindrical) dimension. This implementation also produces 3D volumetric data sets composed of conical beams 248 that are processed to generate 3D images. As in the embodiment shown in FIG. 18, this embodiment uses conventional beamforming techniques to focus and steer beams horizontally to create image on each of a set of frequency-steered imaging planes. However, the conical shape provides an increase field of view and improved uniformity in the horizontal direction.

Figure 20:
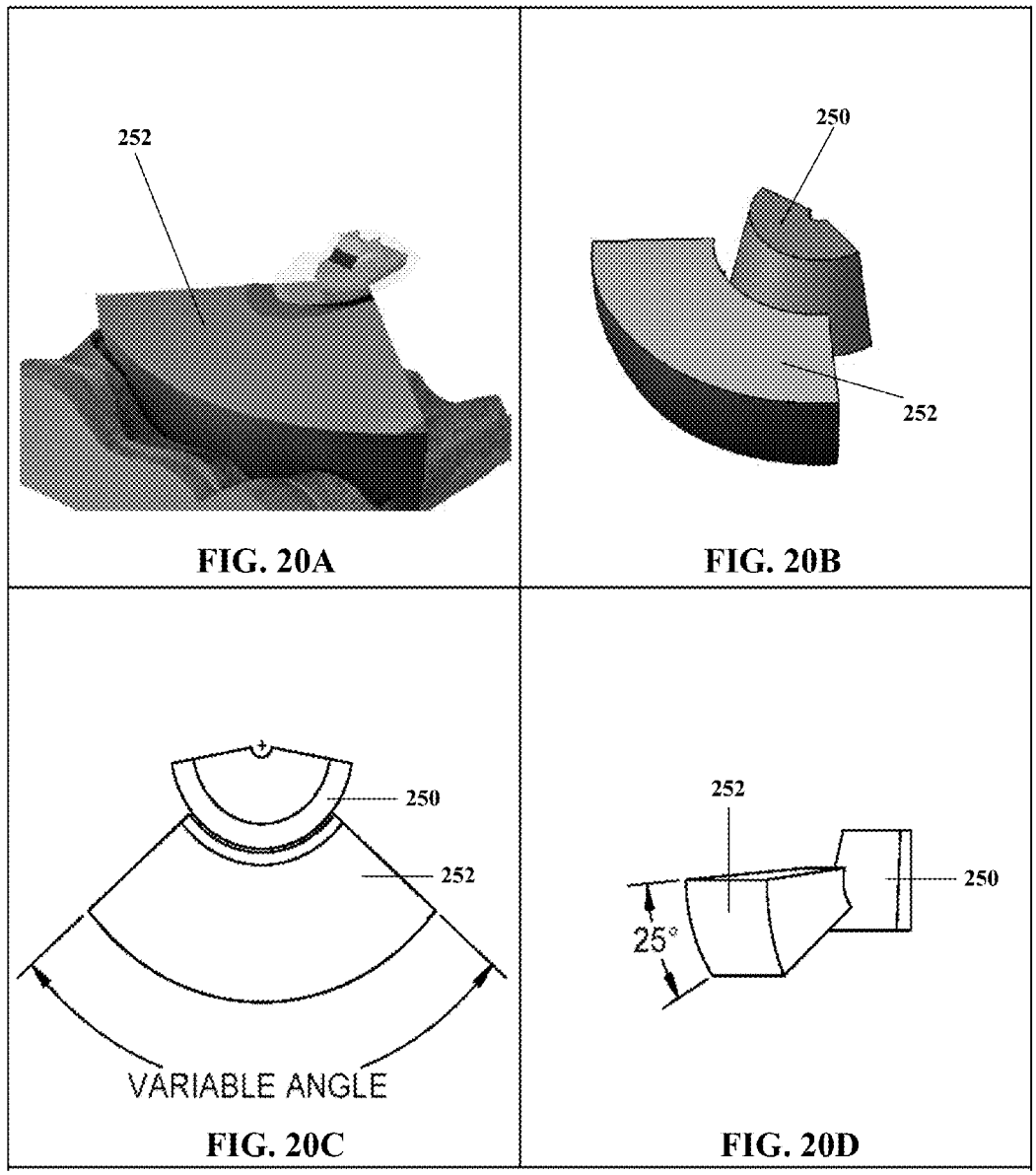
FIGS. 20A-D schematically illustrate an exemplary array design implementing a two-dimensional curvilinear array having a truncated cone configuration frequency-steered and conventionally beamformed to generate a 3D volumetric data set.

FIGS. 20A-D schematically illustrate an exemplary array design implementing a two-dimensional curvilinear array 250 having a truncated cone configuration frequency-steered and conventionally beamformed to generate a 3D volumetric field of view 252 during a single transmit/receive cycle that provides 3D images during single transmit/receive cycles. The horizontal field of view may be programmed into a device implementation or selectable by the user. The curved conical frequency-steered array surface is operated to provide a 3D field of view and, in combination with conventional horizontal beamforming, provides a wide field of view 3D volumetric data set that provides high resolution 3D images. The 3D rendering of FIG. 20A shows how the sonar's field of view 252 is oriented relative to a sensor platform mounted on a vessel 254. FIG. 20C and FIG. 20D show a top view and side view of the array and its field of view, respectively.

Figure 21:
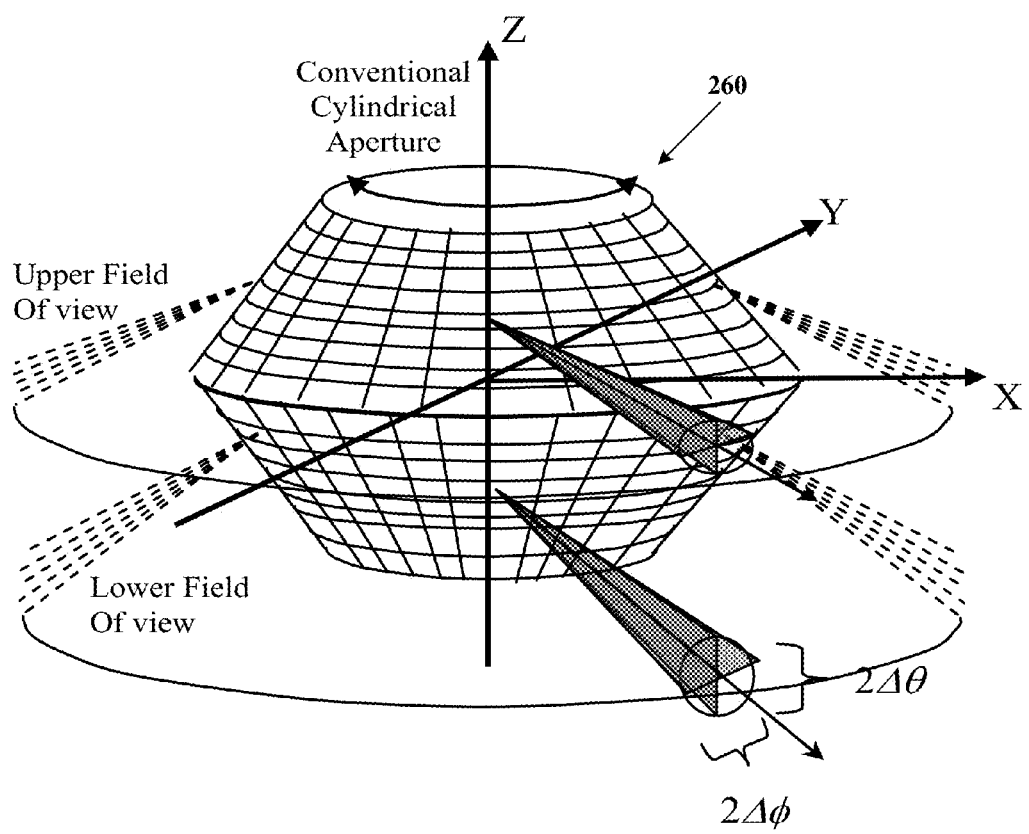
FIG. 21 illustrates an exemplary dual conical curvilinear array assembly that combines frequency steering in the vertical dimension and conventional beamforming in the orthogonal (cylindrical) dimension to provide wide fields of view in both the vertical and horizontal directions.

FIG. 21 illustrates a dual conical curvilinear array implementation. The dual conical curvilinear array 260 is arranged with the wider portions of the respective conical arrays proximate one another is analogous to dual planar arrays arranged in an X-configuration. This dual curvilinear array configuration may be implemented with single order arrays (e.g. m=¼) or with multi-order arrays (e.g. m=¼ & m=⅛). As with the X-configuration in the 2D imaging arrays, the multi-order implementation may combine the multiple vertical fields of view to create one large vertical field. This design provides very wide fields of view in the vertical and horizontal dimensions. The biconical shape provides an increased field of view and improved uniformity in the horizontal direction and a wide vertical field of view.

In addition, all of the array designs and implementations disclosed herein may be acoustically focused for transmission or reception purposes by mechanical shaping of the transmitted and/or received beams, by implementation of acoustic lenses or electronic phasing or time shifting techniques, or using a combination of these techniques. These techniques, combined with the use of frequency-steered arrays, may be use to create high intensity focal points for steered application of high intensity focused ultrasound (HIFU). HIFU can be used for various medical and commercial applications. Focusing can also be used in imaging to improve the imaging of a frequency-steered array in the near field. For instance, a fixed mechanically focused lens can be placed in front of a frequency-steered array and oriented to place the focal zone in the center of the imaging field of view to allow near field, frequency-steered imaging. Focusing can be used with any of the combined frequency-steering and mechanical scanning or conventional beamforming techniques discussed previously.

It will be understood that the foregoing descriptions of various embodiments of methods and systems of the present invention are merely illustrative of the invention and its varied embodiments. Modifications to various aspects of the methods and systems of the present invention will be apparent to those skilled in the art and are intended to fall within the scope and purview of this disclosure and the following claims.

We claim:

1. A method for generating three dimensional images of an underwater target scene, comprising: providing (a) a multi-beam acoustic imaging system including an array combination comprising at least two frequency steerable arrays, wherein each array is aligned on an axis and comprises an array face, and the at least two frequency steerable acoustic arrays are arranged with their axes oriented at an angle to one another and with their array faces aligned on different planes with respect to one another and produce a combined, wide continuous field of view, and (b) a mechanical beam scanning mechanism mounted for scanning the array combination; collecting a plurality of two-dimensional data sets of the underwater target scene by mechanically scanning acoustic beams along a path oriented substantially orthogonal to the direction of beam steering; combining multiple two-dimensional data sets to generate a three dimensional data set; and processing the three dimensional data set to render a three dimensional image of the underwater target scene.

2. The method of claim 1, wherein the mechanical beam scanning mechanism is a rotational mechanism.

3. The method of claim 2, additionally comprising combining multiple images from separate transmissions incoherently by stacking them in a rotational manner to provide the three dimensional data set.

4. The method of claim 1, wherein the mechanical beam scanning mechanism is a translational mechanism.

5. The method of claim 4, additionally comprising combining multiple images from separate transmissions incoherently by stacking them in a side-by-side manner to provide the three dimensional data set.

6. The method of claim 1, wherein the at least two frequency steerable arrays of the array combination are arranged with their axes oriented at an angle to one another in an X-configuration.

7. The method of claim 6, wherein the array axes are arranged at an angle of between about 10° and about 60° to one another.

8. The method of claim 1, wherein at least one of the frequency steerable arrays has an order selected from the group consisting of m=½, m=¼, m=⅛, m=1/16 and in m=1/n, wherein m is the number or fraction of coherent wavelengths between two consecutive elements of the acoustic transducer array and n is any positive or negative number.

\* \* \* \* \*